US011662228B2

(12) United States Patent
Kwok et al.

(10) Patent No.: US 11,662,228 B2
(45) Date of Patent: May 30, 2023

(54) REAL-TIME SURFACE SHAPE SENSING FOR FLEXIBLE STRUCTURES

(71) Applicant: THE UNIVERSITY OF HONG KONG, Hong Kong (CN)

(72) Inventors: Ka Wai Kwok, Hong Kong (CN); Tian Le Tim Lun, Hong Kong (CN); Di-Lang Justin Ho, Hong Kong (CN); Kui Wang, Hong Kong (CN); Kit-Hang Brian Lee, Hong Kong (CN); Kin-Yip Kenneth Wong, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 905 days.

(21) Appl. No.: 16/449,063

(22) Filed: Jun. 21, 2019

(65) Prior Publication Data
US 2019/0390985 A1    Dec. 26, 2019

Related U.S. Application Data

(60) Provisional application No. 62/688,878, filed on Jun. 22, 2018.

(51) Int. Cl.
*G01D 5/353* (2006.01)
*G01B 11/16* (2006.01)
(Continued)

(52) U.S. Cl.
CPC ....... *G01D 5/35316* (2013.01); *G01B 11/165* (2013.01); *G01B 11/18* (2013.01);
(Continued)

(58) Field of Classification Search
None
See application file for complete search history.

(56) References Cited

U.S. PATENT DOCUMENTS

| 9,797,795 B2 * | 10/2017 | White | G01L 11/025 |
| 10,634,486 B2 * | 4/2020 | Casari | G01M 5/0091 |
| 10,989,865 B2 * | 4/2021 | Fok | G02B 6/02076 |

FOREIGN PATENT DOCUMENTS

| EP | 1541984 A2 * | 6/2005 | ............. E21B 47/011 |
| GB | 2532031 A * | 5/2016 | ............. G01B 11/18 |

OTHER PUBLICATIONS

Xu et al. ("3-Dimensional Soft Shape Sensor based on Dual-layer Orthogonal Fiber Bragg Grating Mesh", Optical Society of America, OFC 2017, Jan. 2017). (Year: 2017).*

(Continued)

*Primary Examiner* — Michelle R Connelly
(74) *Attorney, Agent, or Firm* — Leason Ellis LLP

(57) ABSTRACT

A surface shape determination system includes a surface shape sensor in the form of a flexible and stretchable elastomeric substrate with strain/displacement sensing elements embedded in it. The sensor may be a single-core optical fiber with a series of fiber Bragg Gratings (FBGs) located at predetermined positions along its length. A light source provides an incident light spectrum at one end of the fiber. Each grating of the fiber has index modulation which causes particular wavelengths of the light spectrum that do not satisfy the Bragg condition to be reflected back in the fiber. The refractive index of each grating changes with strain on the substrate due to deflection of it. An interrogator captures the reflected wavelengths and retrieves signal information therefrom. A processor receives the output of the interrogator and performs non-linear regression analysis on the information using a neural network to reconstruct the surface morphology in real-time.

21 Claims, 11 Drawing Sheets
(11 of 11 Drawing Sheet(s) Filed in Color)

(51) Int. Cl.
| | |
|---|---|
| G01B 11/24 | (2006.01) |
| G01D 5/26 | (2006.01) |
| G02B 6/02 | (2006.01) |
| G01L 1/24 | (2006.01) |
| G06N 20/00 | (2019.01) |
| G06N 3/084 | (2023.01) |

(52) U.S. Cl.
CPC ............. *G01B 11/24* (2013.01); *G01D 5/268* (2013.01); *G01D 5/35367* (2013.01); *G01L 1/246* (2013.01); *G02B 6/02076* (2013.01); *G06N 3/084* (2013.01); *G06N 20/00* (2019.01)

(56) References Cited

OTHER PUBLICATIONS

K.-H. Lee et al., "Nonparametric Online Learning Control for Soft Continuum Robot: An Enabling Technique for Effective Endoscopic Navigation," Soft robotics, 2017, vol. 4, No. 4, pp. 324-337.
P. Polygerinos, Z. Wang, K. C. Galloway, R. J. Wood, and C. J. Walsh, "Soft robotic glove for combined assistance and at-home rehabilitation," Robotics and Autonomous Systems, 2015, vol. 73, pp. 135-143.
C. Laschi, B. Mazzolai, and M. Cianchetti, "Soft robotics: Technologies and systems pushing the boundaries of robot abilities," Sci. Robot., Dec. 6, 2016, vol. 1, No. 1, eaah3690, 11 pages.
G. Sansoni, M. Trebeschi et al., "State-of-the-art and applications of 3D imaging sensors in industry, cultural heritage, medicine, and criminal investigation," Sensors, , 2009, vol. 9, No. 1, pp. 568-601.
F. Saunders, E. Golden, R. D. White, and J. Rife, "Experimental verification of soft-robot gaits evolved using a lumped dynamic model," Robotica, 2011, vol. 29, No. 6, pp. 823-830.
M. K. Dobrzynski, R. Pericet-Camara et al., "Contactless deflection sensor for soft robots," IEEE/RSJ International Conference on Intelligent Robots and Systems (IROS), 2011, pp. 1913-1918.
W. Yuan, S. Dong, and E. H. Adelson, "GelSight: High-Resolution Robot Tactile Sensors for Estimating Geometry and Force," Sensors (Basel), Nov. 29, 2017, vol. 17, 21 pages.
K. Sato, K. Kamiyama, N. Kawakami, and S. Tachi, "Finger-Shaped GelForce: Sensor for Measuring Surface Traction Fields for Robotic Hand," IEEE Trans Haptics, Jan.-Mar. 2010, vol. 3, No. 1, pp. 37-47.
A. Hermanis, R. Cacurs, and M. Greitans, "Acceleration and magnetic sensor network for shape sensing," IEEE Sensors Journal, 2016, vol. 16, No. 5, pp. 1271-1280.
A. Hermanis and K. Nesenbergs, "Grid shaped accelerometer network for surface shape recognition," 13th Biennial Baltic Electronics Conference (BEC), 2012, pp. 203-206.
P. Mittendorfer and G. Cheng, "3D surface reconstruction for robotic body parts with artificial skins," IEEE International Conference on Robotics and Automation, May 2012, pp. 4505-4510.
N. Saguin-Sprynski, L. Jouanet, B. Lacolle, and L. Biard, "Surfaces reconstruction via inertial sensors for monitoring," 7th European Workshop on Structural Health Monitoring, 2014, pp. 702-709.
Y.-L. Park, B.-R. Chen, and R. J. Wood, "Design and fabrication of soft artificial skin using embedded microchannels and liquid conductors," IEEE Sensors Journal, 2012, vol. 12, No. 8, pp. 2711-2718.
V. Wall, G. Zöller, and O. Brock, "A method for sensorizing soft actuators and its application to the RBO hand 2,", 2017, IEEE International Conference on Robotics and Automation (ICRA), pp. 4965-4970.
H.-N. Li, D.-S. Li, and G.-B. Song, "Recent applications of fiber optic sensors to health monitoring in civil engineering," Engineering structures, 2004, vol. 26, No. 11, pp. 1647-1657.
G. C. Kahandawa, J. Epaarachchi, H. Wang, and K. Lau, "Use of FBG sensors for SHM in aerospace structures," Photonic Sensors, 2012, vol. 2, No. 3, pp. 203-214.
K. O. Hill and G. Meltz, "Fiber Bragg grating technology fundamentals and overview," Journal of lightwave technology, 1997, vol. 15, No. 8, pp. 1263-1276.
P. Wei, J. Liu, Z. Dai, and M. Li, "Monitoring the Shape of Satellite Wing Frame Using FBG Sensors in High Electrionc Noise, Vacuum and—196° C. Environment," IEEE Transactions on Industrial Electronics, 2017, vol. 64, No. 1, pp. 691-700.
B. A. Childers et al., "Use of 3000 Bragg grating strain sensors distributed on four 8-m optical fibers during static load tests of a composite structure," Industrial and Commercial Applications of Smart Structures Technologies, 2001, vol. 4332, pp. 133-143.
M. Amanzadeh, S. M. Aminossadati et al., "Recent Developments in Fibre Optic Shape Sensing," Measurement, 2018, 128, pp. 119-137.
S. C. Ryu and P. E. Dupont, "FBG-based shape sensing tubes for continuum robots," IEEE International Conference on Robotics and Automation (ICRA), 2014, pp. 3531-3537.
C. Shi et al., "Shape sensing techniques for continuum robots in minimally invasive surgery: A survey," IEEE Transactions on Biomedical Engineering, 2017, vol. 64, No. 8, pp. 1665-1678.
A. F. da Silva, A. F. Gonçalves, P. M. Mendes, and J. H. Correia, "FBG sensing glove for monitoring hand posture," IEEE Sensors Journal, 2011, vol. 11, No. 10, pp. 2442-2448.
L. Xu, J. Ge, J. H. Patel, and M. P. Fok, "3-Dimensional soft shape sensor based on dual-layer orthogonal fiber Bragg grating mesh," Optical Fiber Communications Conference and Exhibition (OFC), 2017, pp. 1-3.
H. Zhang, X. Zhu, Z. Gao, K. Liu, and F. Jiang, "Fiber Bragg grating plate structure shape reconstruction algorithm based on orthogonal curve net," Journal of Intelligent Material Systems and Structures, 2016, vol. 27, No. 17, pp. 2416-2425.
S. Rapp, L.-H. Kang, U. C. Mueller, J.-H. Han, and H. Baier, "Dynamic shape estimation by modal approach using fiber Bragg grating strain sensors," Sensors and Smart Structures Technologies for Civil, Mechanical, and Aerospace Systems, 2007, vol. 6529, 16 pages.
R. Kashyap, Fiber Bragg Gratings—Poling of Glasses and Optical Fibers, p. 540.
M. Kreuzer, "Strain measurement with fiber Bragg grating sensors," HBM, Darmstadt, S2338-1.0 e, 2006.
P. Moseley, J. M. Florez, H. A. Sonar, G. Agarwal, W. Curtin, and J. Paik, "Modeling, design, and development of soft pneumatic actuators with finite element method," Advanced Engineering Materials, 2015, vol. 18, No. 6, pp. 978-988.
M. Totaro, A. Mondini, A. Bellacicca, P. Milani, and L. Beccai, "Integrated Simultaneous Detection of Tactile and Bending Cues for Soft Robotics," Soft Robotics, 2017, 12 pages.

* cited by examiner

FIG. 3A
FIG. 3C
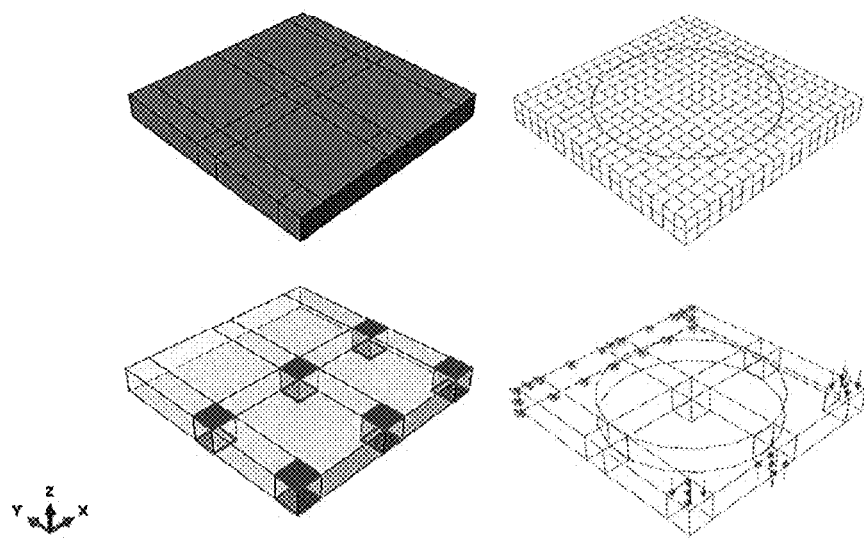
FIG. 3B
FIG. 3D
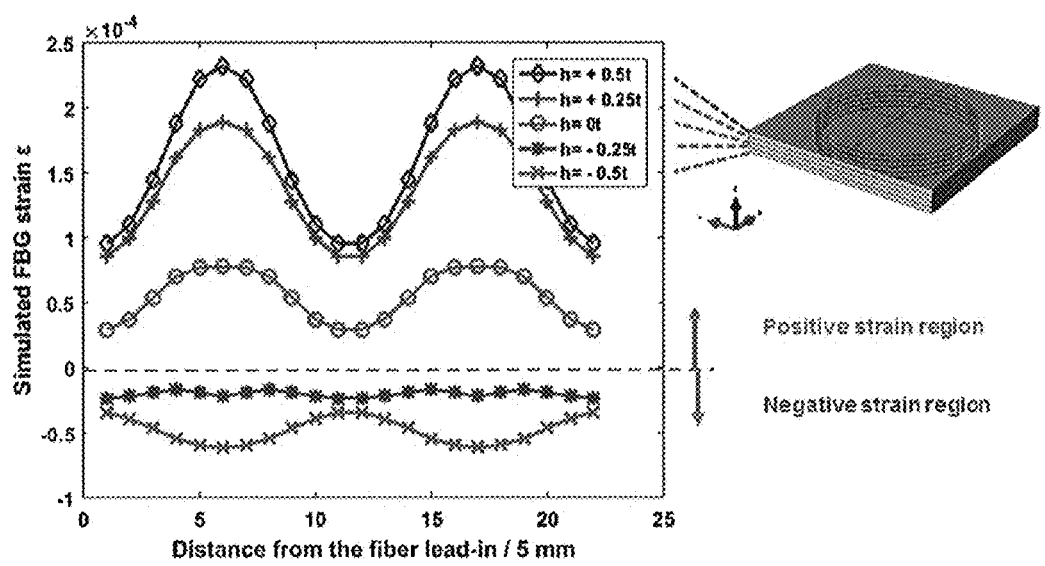
FIG. 4

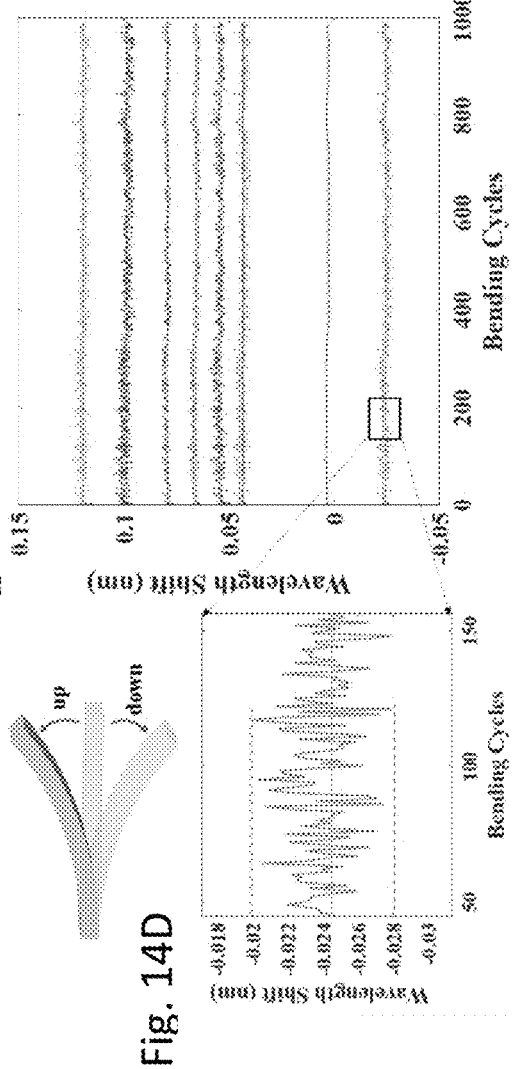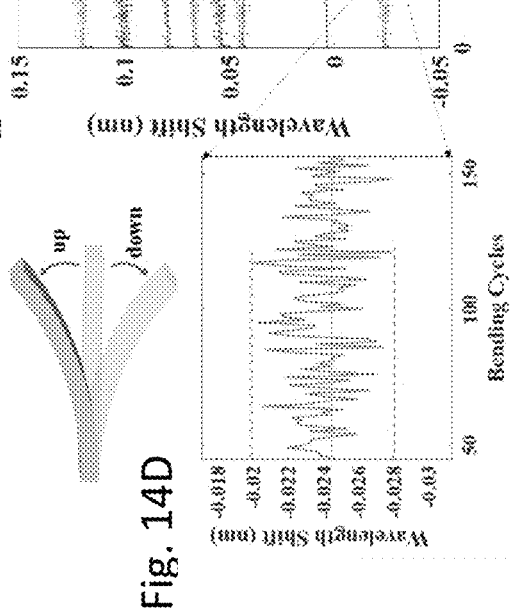
Fig. 14A  Fig. 14B  Fig. 14C  Fig. 14D  Fig. 14E

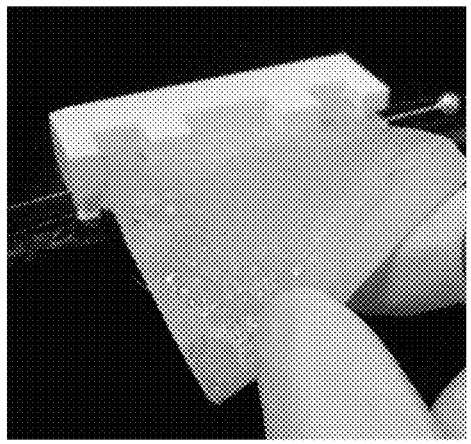 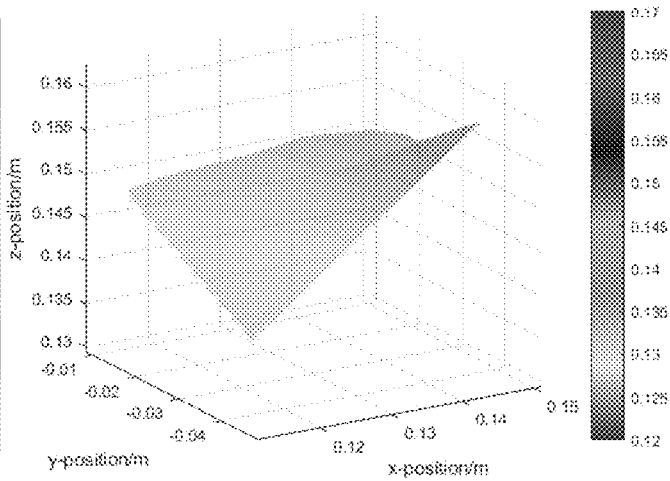
FIG. 15A  FIG. 15B
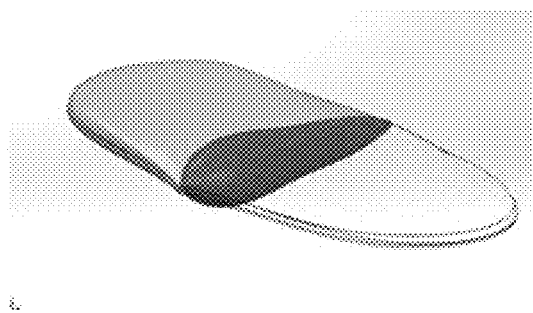 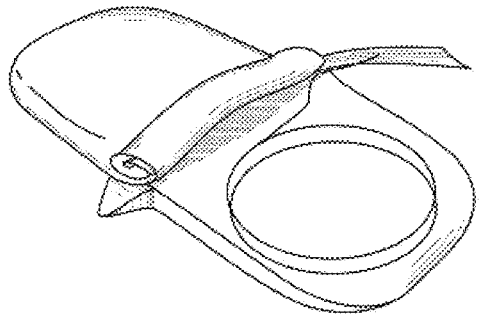
FIG. 16A  FIG. 16B

REAL-TIME SURFACE SHAPE SENSING FOR FLEXIBLE STRUCTURES

The present application claims priority to prior-filed U.S. Provisional Application Ser. No. 62/688,878 filed on Jun. 22, 2018, which is incorporated herein by reference in its entirety.

FIELD OF THE INVENTION

The present application relates generally to the detection of the shape of a surface, and more particularly to a determination of the surface shape based on strain-sensitive sensors located on the surface.

BACKGROUND OF THE INVENTION

In recent years, there has been a trend towards integrating soft and deformable structures into robotic systems. Target applications include surgery [1] and rehabilitation [2], where researchers take advantage of soft and flexible robots for their inherent mechanical compliance. However, these soft robotic systems are often controlled with feedback from either large tracking systems, using indirect variables (e.g. pressure in fiber-reinforced actuators), or are operated in an open loop, neglecting the fact that actual robot shape and posture are inevitably affected by the environment [3].

As a result, measurement of the surface shape itself has become an area of interest. Some research utilize non-contact external equipment such as stereo cameras and LiDAR to reconstruct 3D surfaces [4]. Motion capture systems have also been employed to collect the local position information of subjects, with reflective markers attached to the surface [5, 6]. Gelsight [7] was able to use external CCD cameras with visual processing techniques to reconstruct complex surfaces from image frames. Similarly, GelForce [8] uses CCD cameras to detect the displacement of markers in a flexible substrate to estimate surface traction fields. Although high-resolution sensing data from camera-based systems allows reconstruction of complex deformations, these kinds of systems are inconvenient to be used in soft robotics or stand-alone robotic systems due to their bulkiness and dependence on line-of-sight.

The use of self-contained shape sensors is another approach to measuring flexible 3D objects. Small-sized contact-based sensors can be attached to objects for determining local position and orientation information of the object surface. Microelectromechanical systems (MEMS) allow the integration of many miniaturized sensors to provide local information for global shape reconstruction [9]. Surface shape reconstruction has been performed with a non-stretchable sheet of three-axis accelerometers arranged in a grid pattern [10]. Similarly, Cheng et al. [11] developed an artificial skin that consists of rigid hexagonal sensor units based on accelerometers, which can provide the relative pose of each sensor. Saguin-prynski et al. [12] described their work on 3D curve reconstruction from orientation measurements, and applied multiple curves for surface reconstruction. However, a limitation of grid-type MEMS sensors is that they often have limited flexibility and ability to stretch due to fixed connections between nodes. Due to wiring, they are also complicated when used in large-scale applications.

More recently, liquid conductors, e.g. eutectic Gallium Indium (eGaIn) have been embedded in elastomeric substrates to measure strain in fully-soft sensors. These sensors are inherently compliant and have been designed as artificial skins that can be integrated into completely soft systems, like soft robots [13, 14] Their underlying sensing principle is similar to traditional strain gauges, requiring contact electrodes on either end of the liquid-metal channels. This can make scaling to larger or more complex designs a challenging task.

Optical fiber-based sensors using fiber Bragg gratings (FBGs) are one of the sensor technologies that have proven performance in fields like civil engineering [15] and aerospace industries [16]. FBGs have excellent electromagnetic immunity [17] and can be used in harsh environment [18], such as those with extremely high electromagnetic noise, vacuum pressures and extremely low temperatures. They can carry a high density of sensors on a single fiber [19] with a small form factor and long-term stability[20]. 3D curve-based shape reconstruction based on FBG sensing has been increasingly applied to continuum robots[21], such as steerable interventional needles for biopsy and ablation [22]. However, these methods are specified for tube-shaped reconstruction, where FBGs are used to monitor the 3D curvature. To extend the application of FBGs in shape sensing, more designs have been proposed. Silva et al. [23] designed a wearable sensing glove for monitoring hand gestures and postures, in which a single FBG fiber was laid across a hand in a curvilinear layout. In this design, the glove was able to show the hand motion in real time. However, this was achieved by measuring the bending angle of each finger joint, not from the shape of the hand itself. This creates dependence on the accurate placement of FBGs so that they align with the patient's finger joints. Mable et al. [24] implemented a dual-layer FBG mesh in their 3D shape sensor. It requires precise fixture of FBG allocation, where the two fiber layers must be aligned such that each FBG is overlaid exactly on each other at 90°. Zhang et al. [25] provides a surface shape reconstruction algorithm for a large scale (800×800 mm) plate surface, with a net of orthogonal FBG strain sensors. The sensor can detect both convex and concave object surfaces. However, the use of a relatively rigid Plexiglas substrate limits the deformation to simple shapes. Additionally, for shape sensors employing orthogonal fiber layouts, the ability to stretch of the overall sensor substrate is limited, and depends on precise FBG positioning that strongly affects the reconstruction accuracy [26].

The present invention relates to design and fabricate a new flexible 3D shape sensor which can reconstruct the surface of the subject in real-time.

SUMMARY OF THE INVENTION

According to the present invention, the problems and drawbacks of the prior art are overcome with a design framework for developing a flexible sensor that can reconstruct its 3D surface shape in real time. The sensor has a sparsely distributed underlying strain/displacement sensing modality or sensing elements encased in a flexible substrate. In one embodiment a single-core optical fiber is embedded in a flexible substrate. Along the length of the optical fiber strain-sensitive sensing elements in the form of Fiber Bragg Gratings (FBGs) are placed. These FBGs can detect localized deformations of the fiber. Through numerical analysis, namely finite-element analysis (FEA) or modeling, design parameters such as substrate thickness and layout of the sensing elements can be customized to each application prior to fabrication. FEM is also used to ensure unique sensor element responses for each deformation mode of the sensor (e.g. bending and twisting).

By using the sparse sensor readings from the FBGs a machine learning algorithm executing on a computer performing regression analysis, can be used to reconstruct the entire 3D surface shape of the sensor. Due to the adaptable nature of machine learning regression methods, the physical parameters of the sensor are also highly customizable to the desired application, and the explicit layout of the sensing elements does not need to be known. Computational mechanics methods (e.g. FEA) can be used to accelerate the machine training or learning process and greatly increases the resolution of surface shape measurements. The FEA can be used to reduce the training by first initializing the training model with simulated data followed by calibration with real sensor data. It can also be used for reconstruction of dense surface data by mechanics-based interpolation based on the sparse sensor output data.

The surface shape sensor's design methodology/framework is applicable to other underlying strain/displacement sensing modalities (not limited to FBGs) that are inherently flexible and also can be used with different substrate types. This is due to the flexibility and customizability of FEA simulation and the machine learning-based reconstruction approach.

The material for the sensor substrate can be freely chosen based on the application's requirement, including mechanical properties such as flexibility, ability to stretch, size, stiffness, thickness, strength. For example, for application with soft robotics (which are typically constructed from silicone rubber), a flat silicone rubber substrate facilitates easy integration and ensures mechanical compatibility. Similarly, for medical or rehabilitation use, medical-grade silicone rubber can be used as the sensor substrate to allow safe prolonged contact with patients, e.g., when measuring the surface shape of a patient in a local area for the purpose of palpation.

In one embodiment, a single optical fiber with many FBGs along its length is embedded in a flat silicone rubber structure that is used to measure strains on both its top and bottom surfaces. The surface displacements represented by the strains are mapped based on optical sensing signals passed through the fiber by using a neural network machine learning approach. In this approach, fabrication errors are compensated in the trained neural network and overall fabrication difficulties are reduced. The system is capable of object shape sensing with the proposed sensor. Also, it can reconstruct surfaces that are undergoing real time both bending and twisting, as well as more complex deformations.

Using only the sparse sensor readings from the FBGs, the machine learning algorithm can reconstruct the entire surface shape of the sensor and hence the object on which it is located. Due to the adaptable nature of machine learning regression methods, the physical parameters of the sensor are also highly customizable to the desired application.

Currently, most surface shape sensors are unable to respond to in-plane loading since they are intrinsically non-stretchable. This limits their sensing application to surfaces/objects that are also non-stretchable. The customizability of current surface shape sensor systems is also restricted by the substrate and choice of sensing element. In addition to this, for a surface shape sensor to capture high-density data, a large number of individual sensors are needed, which leads to a proportionally large number of electrical connections, which can greatly hinder the ease-of-integration with existing systems. For the same reason, the scaling of electrode-based surface shape sensing devices to larger dimensions is impractical.

The present invention, in which one embodiment utilizes an optical fiber with Fiber Bragg gratings sensors and embedded into a flexible substrate made of silicone elastomer, can be scaled-up easily without the need for additional connections because optical fiber FBGs are used as the underlying sensing element and have a high multiplexing capability. The overarching purpose of this invention is to provide the design, fabrication and implementation approach for a stretchable, flexible, and easily scalable surface shape sensing device that makes use of only sparse sensing points and minimizes external connections.

While one embodiment of the invention principally relies on traditional silica-based optical fibers, the invention may also be extended to polymer-based fibers, which can provide enhanced flexibility and elongation, while maintaining similar optical performance. With polymer-based fiber, the flexibility and deformability of the surface shape sensor is improved, allowing measurement of more complex surface morphologies.

In summary, the surface shape sensor of the present invention can have its surface morphology densely reconstructed (and hence the surface of an object to which it is attached) based on sparse sensing element data. The sensor body/substrate is made from flexible material and is embedded with flexible strain-sensing elements. The functioning of the sensor is achieved by:

1. Conducting computational mechanics modelling (e.g. FEM/FEA) of the sensor prior to fabrication to tailor the sensor's parameters, e.g. sensor dimensions and the placement of sensing elements, and
2. The use of AI (non-linear regression methods, e.g. neural network) and computational mechanics modelling to calibrate the sensor and reconstruct the morphology of the sensor.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The foregoing and other objects and advantages of the present invention will become more apparent upon reference to the following detailed description and annexed drawings in which like designations denote like elements in the various views, and wherein:

FIGS. 3A-3D illustrate finite element modeling of the sensor;

FIG. 4 shows simulated FEA strain responses for the sensor of the present invention at five offset distances under 3-point bending;

FIGS. 14A-14E are diagrams showing the repeatability of wavelength shift for each FBG in the sensor with periodic loading, wherein FIG. 14A shows a sensor under: no deflection, upward deflection and downward deflection, respectively, FIG. 14B shows wavelength shift fluctuations for 8 FBGs, FIG. 14C shows wavelength shifts of the 8 FBGs at peak bending, FIG. 14D is a blowup of a portion of a wavelength shift fluctuation of one FBG in FIG. 14B, and FIG. 14E is a hysteresis plot comparing the vertical position of the distal node C2 in FIG. 13A and the wavelength ship of the FBG with the largest shift;

FIGS. 15A and 15B show a comparison between a photograph of a surface shape and its reconstruction;

FIG. 16A is an example of surface shape sensing of the side wing of a soft stingray model and FIG. 16B is a photograph of the model;

DETAIL DESCRIPTION OF ILLUSTRATIVE EXEMPLARY EMBODIMENTS

Figure 1:
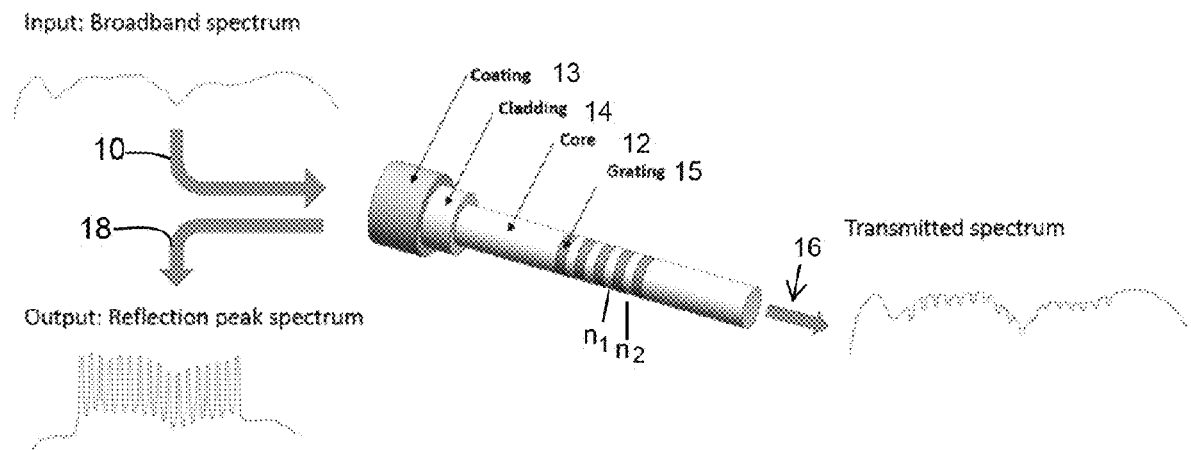
FIG. 1 shows the operating principles of FBGs.

The present invention utilizes a single optical fiber with sparsely distributed fiber-Bragg gratings (FBGs) embedded in a silicone rubber sheet. The FBGs can capture the mechanical strain in the top and bottom surfaces of the sensor, and the strain data is used to reconstruct the overall sensor surface morphology. Since the sensor may be placed on the surface of an object, it can also reconstruct the surface morphology of the object. According to the invention, one single-core optical fiber is coiled within the silicone substrate such that it forms two layers. This ensures unique optical signals are associated with a particular sensor bending configuration.

FGBs are selected as the sensing element in the system of the present invention because they are easy to fabricate and assemble. In addition, FBGs have excellent electromagnetic and corrosion immunity, and can provide a high density of sensors on a single fiber.

FBGs have a high multiplexing capability so they are ideal for use in forming sensing networks for applications at different scales. In order to make the surface shape sensor of the invention flexible and applicable, three major design factors must be considered as follows:

Flexibility

Soft robots are generally highly compliant with their working environments. Sensors that integrate with soft and deformable robots must be adequately flexible to be compliant with the robot body and surroundings. Thus, silicone rubber is chosen as the substrate layer for high compliance and firm bonding with common soft robots fabricated with silicone.

Ability to Stretch

Surface shape sensors are usually designed with grid-form sensing networks. However, this configuration can heavily limit the degree of flexibility and ability to stretch, especially when in-plane loadings exist. In-plane loadings are commonly found in soft robotic applications due to stretching. The fiber layout in the sensor of the present invention allows for the ability to stretch in different directions. Since the requirement of the ability to stretch vary with applications, sensor placement may need to be considered.

Reliability

In contrast to rigid robots, soft robots are expected to respond appropriately to contact with unknown environments. FBGs provide excellent durability to harsh environments including dramatic temperature changes and chemical corrosions [27]. This ensures long-term stability and reliability of the sensor. With the present invention Draw Tower Gratings (DTGs) are selected instead of conventional FBGs. DTGs are made by the draw-tower process and offer over four times the mechanical strength of classical FBGs.

The sensing principle of the present flexible shape sensor is based on global and local strain sensing. When the sensor is deformed by a bending load, twisting load or other deformations, the FBG sensors embedded in silicone rubber experience unique displacements, with strain fields generated from the displacements/deformations. The strains are transferred onto the FBG sensors at a particular transfer rate, which depends on the fabrication and bonding quality. The decomposed axial strains along the fiber are then converted to optical signals in which different strains will result in different wavelength components measured by an FBG integrator. By mapping the strain-displacement, the shape reconstruction is determined. In 3D elasticity, the relationship between strain ε and displacement u is defined as:

$$\varepsilon_{ij} = \frac{1}{2}(u_{i,j} + u_{j,i} + u_{k,i}u_{k,j}) \quad (1)$$

where k sums over 1, 2 and 3.

FBGs are a type of intrinsic optical sensor, which responds to environmental parameters. In each grating, the refractive index of the fiber core is permanently increased by exposing the fiber laterally to an intense ultraviolet (UV) beam with a periodic pattern. The refractive modulation index is fixed and determined by the pattern of UV exposure.

A small amount of light (typically around 10%) is reflected at each grating. When the incident light is approximately double the grating period, the reflected light signals are transmitted back in the form of a reflected spectrum due to the multiplexing property of FBGs. The wavelength at which this reflection occurs is called the Bragg wavelength and the condition is well known as the Bragg condition:

$$\lambda_B = 2n_e \Lambda \quad (2)$$

where $\lambda_B$ is the reflected wavelength or Bragg wavelength, $n_e$ is the effective refractive index, and $\Lambda$ is the grating period. The wavelengths that are phase mismatched will not be reflected thus transmit to the fiber end as shown in FIG. 1. Since wavelengths will be reflected back only when the Bragg condition is satisfied, attenuation and signal variation are generally negligible. This demonstrates a fundamental advantage of fiber Bragg gratings that ensure high accuracy of grating wavelength measurement.

As shown by FIG. 1 each FBG 15 has a fixed index modulation $n_1$, $n_2$, etc. that reflects a particular wavelength of light. The light spectrum 10 is introduced into the fiber, which consists of a coaxial core 12 and a cladding 14 covered with a coating 13. Light with wavelengths that do not satisfied the Bragg condition will simply be transmitted through the fiber and will exit the end of the fiber as light 16, i.e. the transmitted spectrum. Light which meets the Bragg condition will be reflected back as light 18, i.e., the reflected spectrum. Due to the temperature and strain dependence of the grating parameters, the reflected wavelengths will also change, thus enabling the sensing of strains/temperature.

Equation (2) shows that the shift in the central wavelength of the reflected spectrum, or Bragg wavelength, depends on the effective refractive index and the grating period which are a function of both temperature and strain. Therefore, the sensing response varies when the sensor experiences temperature changes or external forces. When external forces are applied to the sensor, compression or tension stresses will be induced along the whole fiber. The sensor deformation will be transferred into a series of fiber strains which correlate to the strain transfer ratio and the bonding quality. The mechanical strains generated, which change the grating period and the effective refractive index, result in shifts in Bragg wavelengths [28]. Including the effect of temperature, this allows strain and temperature measurements to be reflected in the FBG spectrum in real-time. This dependency is described as follows:

$$\frac{\Delta \lambda}{\lambda_0} = k\varepsilon + \alpha_\delta \Delta T \qquad (3)$$

where $\Delta \lambda$, is the wavelength shift, $\lambda_0$ is the base wavelength at fabrication, k is the gage factor, and $\Delta T$ is the change in temperature in K. $\alpha_\delta$ is the change of refraction index:

$$\alpha_\delta = \frac{\delta n/n}{\delta T}, \qquad (4)$$

where n is the refraction index of the fiber. For the strain $\varepsilon$, there is:

$$\varepsilon = \varepsilon_m + \varepsilon_T \qquad (5)$$

where $\varepsilon_m$ is the mechanical-induced strain component, and $\varepsilon_T$ is the temperature caused strain.

$$\varepsilon_T = \alpha_{sp} \Delta T \qquad (6)$$

where $\alpha_{sp}$ is the expansion coefficient per K of the specimen.

Taking Equation (5) and Equation (6) into the Equation (3), we get $$\frac{\Delta \lambda}{\lambda_0} = k\varepsilon_m + (k\alpha_{sp} + \alpha_\delta)\Delta T \qquad (7)$$

Since the fiber possesses cylindrical geometry of high aspect ratio, the FBG is highly sensitive to strain in the longitudinal direction as compared to the transverse or out of plane strain. The first expression in Equation (7) describes the influence of mechanical strain and the second expression refers to the change in glass refraction index n and temperature strain, which is solely dependent on temperature. The temperature strain is induced from the specimen strain. Therefore, the specimen thermal expansion coefficient is considered instead of thermal expansion coefficient of glass.

Because the temperature has an impact on the sensing signals, temperature compensation has to be performed in order to get precise strain measurements. Conventionally an additional temperature grating is applied to correct other strain measuring gratings. The simplest way is to measure the temperature only using an FBG sensor located at a zero mechanical strain position. Substitute $\varepsilon_m=0$ into Equation (7), whereby the wavelength shift of the compensation FBG, $\Delta \lambda_c$ and the resultant wavelength shift of active mechanical strain measuring FBG, $\Delta \lambda_m$ are given by:

$$\frac{\Delta \lambda_c}{\lambda_{0c}} = (k\alpha_{sp} + \alpha_\delta)\Delta T \qquad (8)$$

For the FBGs used for strain sensing, Equation (6) can be rewritten as:

$$k\varepsilon_m = \frac{\Delta \lambda_m}{\lambda_{0m}} - (k\alpha_{sp} + \alpha_\delta)\Delta T \qquad (9)$$

Then if we take Equation (8) into Equation (9), we get $$\varepsilon_m = \frac{1}{k}\left(\frac{\Delta \lambda_m}{\lambda_{0m}} - \frac{\Delta \lambda_c}{\lambda_{0c}}\right) \qquad (10)$$

where $\lambda_{0c}$ is the central wavelength of the compensation FBG and $\lambda_{0m}$ is the central wavelength of the mechanical strain measuring FBG.

For an initial simplified exemplary embodiment, a rectangular geometry is selected for the sensor base for ease of its fabrication. In particular, the sensor base is molded from a silicone rubber square (45 mm×45 mm) and the FBG sensor is wrapped circularly on the top and bottom of the sensor with a diameter of 35 mm. The FBG sensor is placed with an off-midplane distance to avoid getting the same sensor response from a different deformation mode shape, e.g. the same bending strains would be obtained from positive and negative bending with the same magnitude of bending moment.

Figure 2:
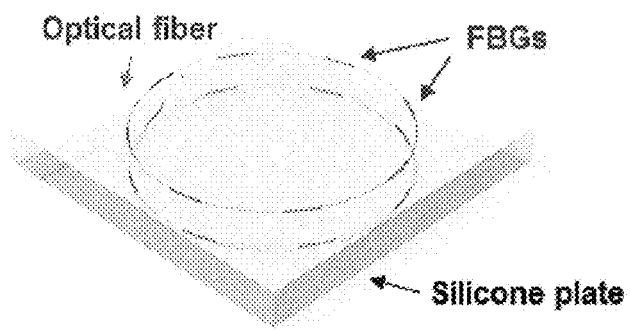
FIG. 2 illustrates the overall sensor structure according to an exemplary embodiment of the present invention.

The overall design includes five layers, i.e. middle sensor base substrate layer, two FBG sensor layers and two silicone protection layers, as shown in FIG. 2. All of the layers are made of silicone rubber (Smooth-On Ecoflex-0030) except the fiber sensor layers. The protection layers are thin coatings above the FBG layers and have a negligible effect on sensor rigidity and flexibility.

Thus, the overall sensor structure is as follows: i) a top thin silicone protection layer, ii) a first FBG layer, iii) a silicone plate, iv) a second FBG layer, and v) a bottom thin silicone protection layer. The distance from mid-plane to fiber is defined as h and the sensor thickness is defined as t. During operation, one end of the optical fiber is connected to an optical interrogator which retrieves the signal information from the embedded FBGs. This information is then processed in a program that performs non-linear regression using a neural network to reconstruct the 3D surface morphology in real-time.

The FBG sensors or gratings are written on a custom-made low bend loss fiber (FBGS LBL-1550-125, DTG®s) with, for example 17 draw tower gratings, of which 16 gratings act as strain sensors and are bonded on the deformable sensor surface, and the remaining grating is used for temperature compensation. The FBG sensor layer has a circular shape in order to obtain both global and local strain information and to reduce pre-stress/strain to provide a higher ultimate allowable stress/strain sensing range. Directional sensitivity of each grating is not considered since shape sensing has no specific deformation mode shapes.

In order to select the proper design parameters for sensor thickness t and fiber offset h, parametric studies were conducted to evaluate the sensor performances with different sensor designs. The estimated and predicted sensor responses of the designed shape sensor were computed from commercial finite element analysis software, Abaqus 6.14. Finite element analysis was adopted due to its high adaptability in computing sensor responses with various sensor geometry. In this research, two selected parameters are studied.

The workflow to analyze sensor parameters is shown in FIG. 3. Part models are first built with designed dimensions. The silicone sensor base and the sensor fiber are modeled as 3D deformable models. The protection layers are not included in the simplified model because they have a negligible effect on overall sensor rigidity. The materials are then assigned to the models. For silicone rubber, it is modeled as a hyper-elastic material using Ogden strain energy potential. Parameters of the 3-term Ogden model are adopted from the literature [29]: $\mu_1$=0.024361, $\mu_2$=6.6703× $10^{-5}$, $\mu_3$=0.45381×$10^{-3}$, $\alpha 1$=1.7138, $\alpha_2$=7.0679, $\alpha_3$=−3.3659, D1=3.2587, D2=D3=0. The units for μs and Ds are MPa and $(MPa)^{-1}$, respectively, while the units for as are dimensionless.

To model the mechanical behavior of the fiber material, a linear elastic model FIG. 3C is used with Young's modulus of 70 GPa and Poisson's ratio of 0.16. The final sensor base shown in FIG. 3D, is meshed to 648 of the C3D8RH brick elements (18×18×2) and the sensor fiber is meshed to 44 of the T3D2H truss elements, which are 2-node linear 3D truss elements that only transfer axial strains. The fiber part is tied to the desired sensor base surface with node region-to-surface constraint. To simulate sensor response under different loading conditions, one side of the sensor is set as a clamped condition (red dots to the left in FIG. 3D) while others are unbounded as free ends. All the simulations are done under static loading steps. To generate deformations such as bending and twisting patterns, surface loads are applied on twelve surfaces which are marked as red squares in FIG. 3B.

Thus, the finite element modeling workflow is as follows:

(a) Part model and assembly: Silicone plate and optical fiber are built with desired dimensions. The silicone protection layers are neglected due to the low thickness. The fiber model is tied on the surface of the silicone plate model with surface-to-node region constraint.

(b) Meshing: The silicone plate model (45 mm×45 mm×5 mm) is meshed to 5184 C3D8RH elements (36×36×4) and the sensor fiber is meshed to 44 T3D2H elements which are 2-node linear 3D trusses that only allow axial strains.

(c) Loading and surface set definition: 12 surface sets are predefined to apply random pressure loadings for simulating external forces acting on the sensor surfaces following the node rotations.

(d) Boundary conditions: one side of the sensor is bounded with the clamped condition while others are unbounded as free ends.

In FIG. 3 x-, y-, z-displacement fields on the top surface of the sensor and axial fiber strains are obtained from the simulation output. Temperature effects and pre-strain are not considered in these simulations. From Equation (10), the relation between wavelength shift and mechanical strain can be described as $\Delta\lambda \sim \varepsilon_m$. This indicates that the simulated sensor strain responses and wavelengths are correlated, which can be used to predict the actual sensor responses.

Consider the effect of the fiber-offset distance h where the thickness t is arbitrarily set as 5 mm. According to bending theory, strains along the neutral plane are the same when the sensor is subjected to positive and negative bending moment. This indicates that the FBGs must be offset from the neutral plane to identify the direction of bending. In FIG. 4, each sensor response is obtained when the sensor is placed on two supporting pins and subjected to a loading F by displacing a cylinder with a radius of 20 mm. This simulates a typical deformation pattern in which bending is created by pushing. When the fiber offset from midplane h=0 mm, the simulated strains are slightly positive due to the in-plane stresses induced by pushing. For pure bending, the sensor will have approximately zero strain readings when pre-strain is not considered. When h=+0.25 t=+1.25 mm, a significant rise in strain magnitude is observed. When h=−0.25 t=−1.25 mm, the simulated strains shift to the negative region due to the compression load. For h=±0.5 t=±2.5 mm, a further increase in strains is observed. However, gain in compression strain sensitivity is much lower. Noting that when the fiber is in compression, it could buckle in favorable directions. Thus, the deformed fiber will experience lower stresses in magnitude compared to a tension load. To maximize the strain magnitude for better strain pattern discrimination, the highest offset value is selected, i.e. h=±0.5 t=±2.5 mm.

Simulated strain responses of the sensor at five offset distances h under 3-point bending are shown in FIG. 4. Each simplified fiber ring model measures the strains in the corresponding plane, e.g. at h=0, the fiber is embedded in the mid-plane. The magnitude of negative strains from compressive stresses are small when compared to positive strains from tension loads, thus sensing strains at small h is less favorable. Note that the neutral plane is not necessarily the same as the mid-plane and depends on in-plane and out-of-plane loadings.

Figures 5A, 5B, 5C:
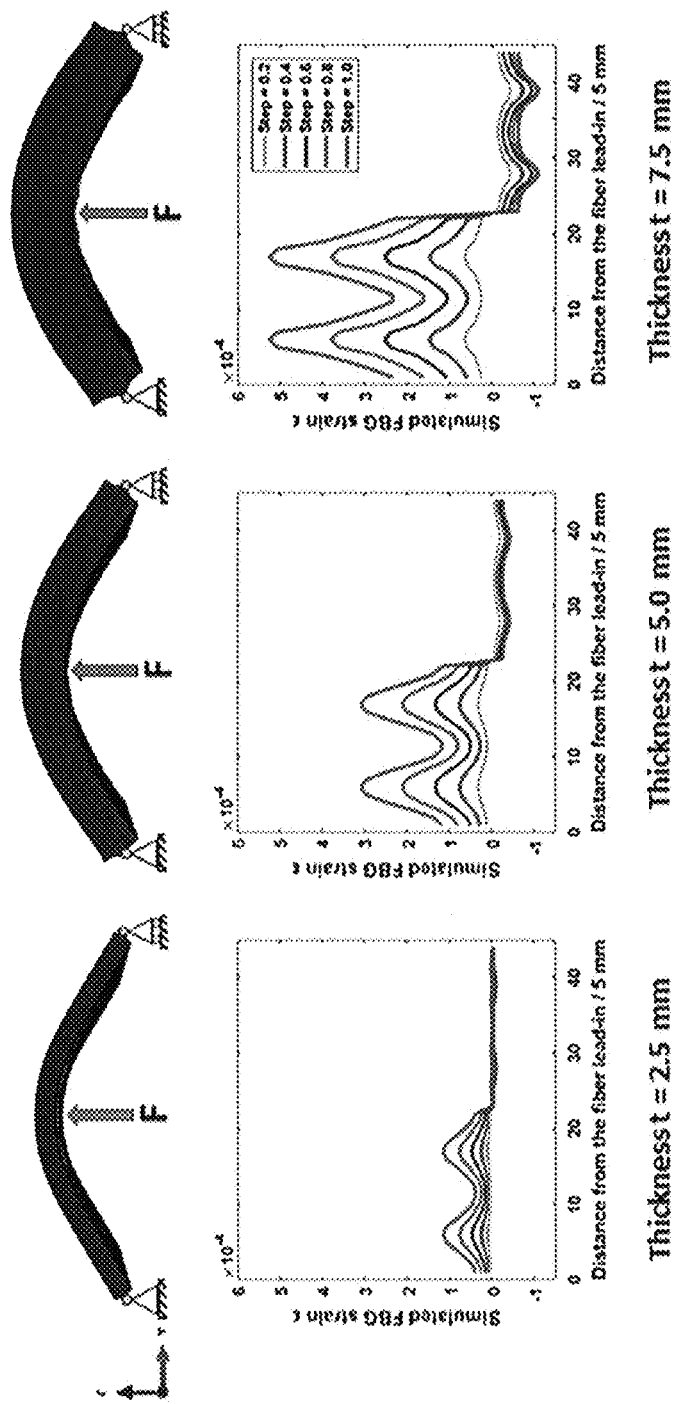
FIG. 5A-5C show simulated FEA strain responses for the sensor of the present invention under 3-point bending, where the sensor has thicknesses of 2.5 mm, 5.0 mm and 7.5 mm, respectively.

A second analysis is conducted to study the thickness t of the sensor base. For the soft and flexible sensor, a low thickness would be an advantage when integrating the sensor on objects, e.g., actuators and other components, for flexibility. However, since a single core fiber is used, the fiber needs to be offset from the mid-plane and must have a suitable thickness in order to discriminate deformation patterns. The thickness t is determined by considering the strain patterns with varying thickness (2.5-7.5 mm). See FIG. 5. The range is selected by considering an overall sensor thickness that is high enough and will not inhibit flexible motions. In the first analysis, it is concluded that the sensor fiber should attach to the surfaces of the sensor to acquire maximum strain responses. In FIG. 5, the strain responses of the sensor structure are simulated under the same bending as FIG. 4. When the sensor base thickness t is close to ten times that of the sensor fiber diameter, i.e. t=2.5 mm, the compression strain responses are not significant enough to identify shape patterns due to overlapping and may be altered by sensor noise. By increasing the sensor thickness, the output responses also increase and become noticeable. At t=7.5 mm, the sensor responses are maximized. However, several compressive strains start to saturate. Further deformations may induce unfavorable compressive stress and lead to instability, buckling of the fiber and eventually breakage of the fiber inside the silicone plate. After comparing the sensor responses with more deformation modes, 5 mm was selected as the best sensor thickness for the primary shape, so as to yield distinct strain patterns while providing high flexibility. Depending on the robot design and sensing requirement, the sensor thickness can be adjusted for optimal performance.

Simulated strain responses of the sensor at different thickness under 3-point bending are shown in FIG. 5, where offset h=±0.5t. The magnitude of the strain varies proportionally to the sensor thickness. At thickness t=2.5 mm, strains due to compressive loadings are overlapped. At thickness t=5 mm, negative strains can be clearly identified and used to discriminate deformations. At thickness t=7.5 mm, the sensitivity is further increased with several acute points, however, this also leads to a higher possibility of instability, fiber buckling and less flexibility.

The surface shape sensor is fabricated by casting platinum-catalyzed silicones, i.e. Ecoflex 00-30. Ecoflex silicones are chosen due to their low viscosity, which favors mixing and de-airing in fabrication and high bonding strength with current soft robots that commonly use similar silicones. Molds are designed with special patterns for different fiber configurations. Since this design is focused on general surface sensing and structural simplicity, a circular fiber configuration is used.

Figures 6A, 6B, 6C, 6D:
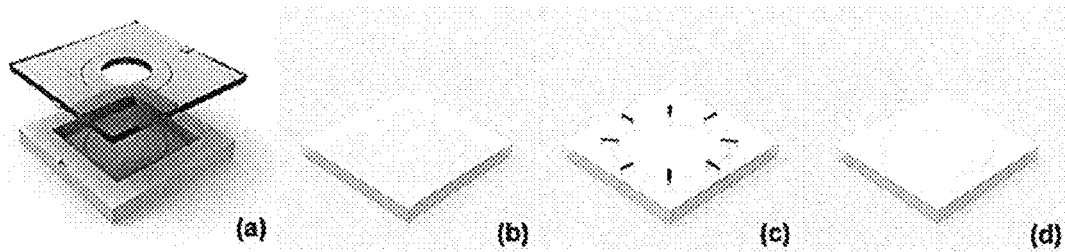
FIGS. 6A-6D show steps in the fabrication of the sensor according to the present invention.

As shown in FIG. 6A, a mixed portion of silicones is degassed and injected into 3D-printed molds which have been coated with a releasing agent. It is then kept in an oven at 55° C. for 60 minutes. Next demolding takes place in which cured silicone with designed channels is removed from the mold. FIG. 6B. After demolding the patterned silicone plate, the top and bottom surfaces of the plate are penetrated with a needle for placing the fiber (FIG. 6C). Since stresses are induced by shaping the fiber to the target configuration, small pins are used to temporarily fix the fiber shape on the silicone plate, thus avoiding having the fiber return to a neutral position. A thin layer of ELASTOSIL® E41 is applied to partially seal the optical fiber and silicone plate. The FBG embedding step is repeated on the other surface, Finally the pins are removed and two thin silicone coatings (same material as silicone plate) are placed and bonded firmly on the top and bottom surface of the silicone plate as protective layers (FIG. 6D). Destructive tests have been conducted and demonstrate a high bonding strength developed between the fiber and silicone plate.

Figure 7:
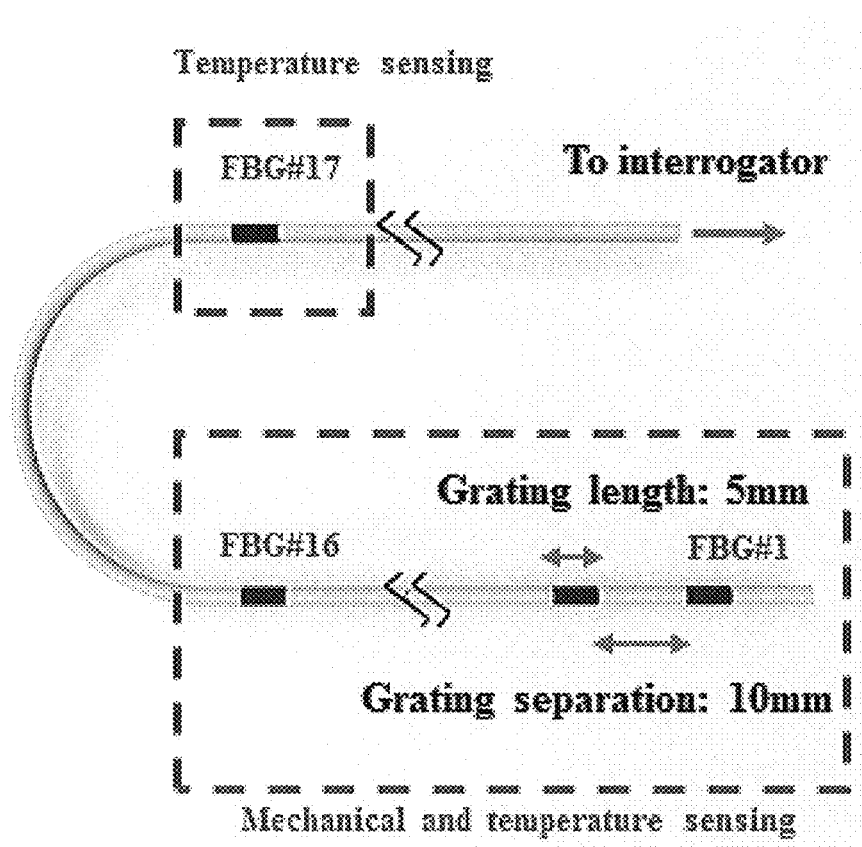
FIG. 7 illustrates the configuration of the FBGs in the optical fiber of the present invention.

In an exemplary embodiment shown in FIG. 7 the fiber Bragg gratings embedded in the silicone plate are made from intense ultraviolet light exposure on the optical fiber core. A fixed index modulation, i.e. a grating, is created and increased to set the core refractive index permanently. The fiber has a cladding diameter of 125 μm and is coated with Ormocer (creating a diameter of 195 μm). Each grating has a length of 5 mm, which smaller length is also available in practice. Each grating is separated with a 10 mm gap for the first 16 FBGs and the distance between 16th and 17th FBG is 450 mm. the 16 FBGs cover two surfaces of the silicone plate to capture strain information and the remaining $17^{th}$ FBG is used as a temperature compensation sensor. It is positioned away from the 16th FBG for ease of assembly. The first grating starts at 1588 nm and ends at 1540 nm for the last grating. The center wavelength of each FBG reflection peak has a wavelength separation of 3 nm to its neighbors to prevent overlapping of reflection peaks and to ensure clear peak identification. Depending on the applications, the separation could be tuned for more/fewer FBGs. Gratings with shorter wavelengths, e.g. 1540 and 1543 nm are located closer to the fiber lead-in end while gratings with longer wavelength are put near to the lead-out end. A large portion of optical energy propagating in the fiber is confined in the core, while the remaining optical energy travels in the cladding. Since the shorter the reflected Bragg wavelengths, the larger the optical loss, FBGs with shorter wavelengths are placed near to the lead-in end. The reflectivity of the fiber is over 10% and Full width at half maximum (FWHM) is 0.15 nm. The fiber is bend-insensitive and has a bending radius up to 6 mm. The reflected spectrum is captured by an optical spectrum analyzer (Anritsu MS970A) used as an interrogator.

Any local deformation occurs on the side of the sensor, strains will be generated according to the deformation location and result in individual grating responses. For deformations on the center of the sensor, it is expected to generate global grating responses but with lower magnitude, since the gratings are surrounding the center but are not aligned with the resultant strain. Using the combination of these grating responses, the sensor reconstructs and discriminates different deformation mode shapes, including bending and twisting poses, which are commonly seen in soft robotics.

An artificial neural network is composed of a network of neurons that change their internal activation states and generate outputs when inputs are received. The outputs and inputs of specific neurons are linked to each other and form a direct and weighted graph. The weights are computed throughout a selected training process with a desired learning function. The performance of the network can be adjusted by varying the governing learning rule and thus the weights of the neurons and activation. This data-driven approach usually requires a large number of samples for training of the model, which maps the input variables to target outputs. A typical neuron transfer function is as follows:

$$o = f\left(\sum_i w_i I_i\right) + b \tag{11}$$

$$f(x) = \frac{1}{1 + e^{-x}} \tag{12}$$

where o is the scalar output, f is the sigmoid function, $w_i$ is the i-th weight, $I_i$ is the i-th input and b is the bias.

Figure 10:
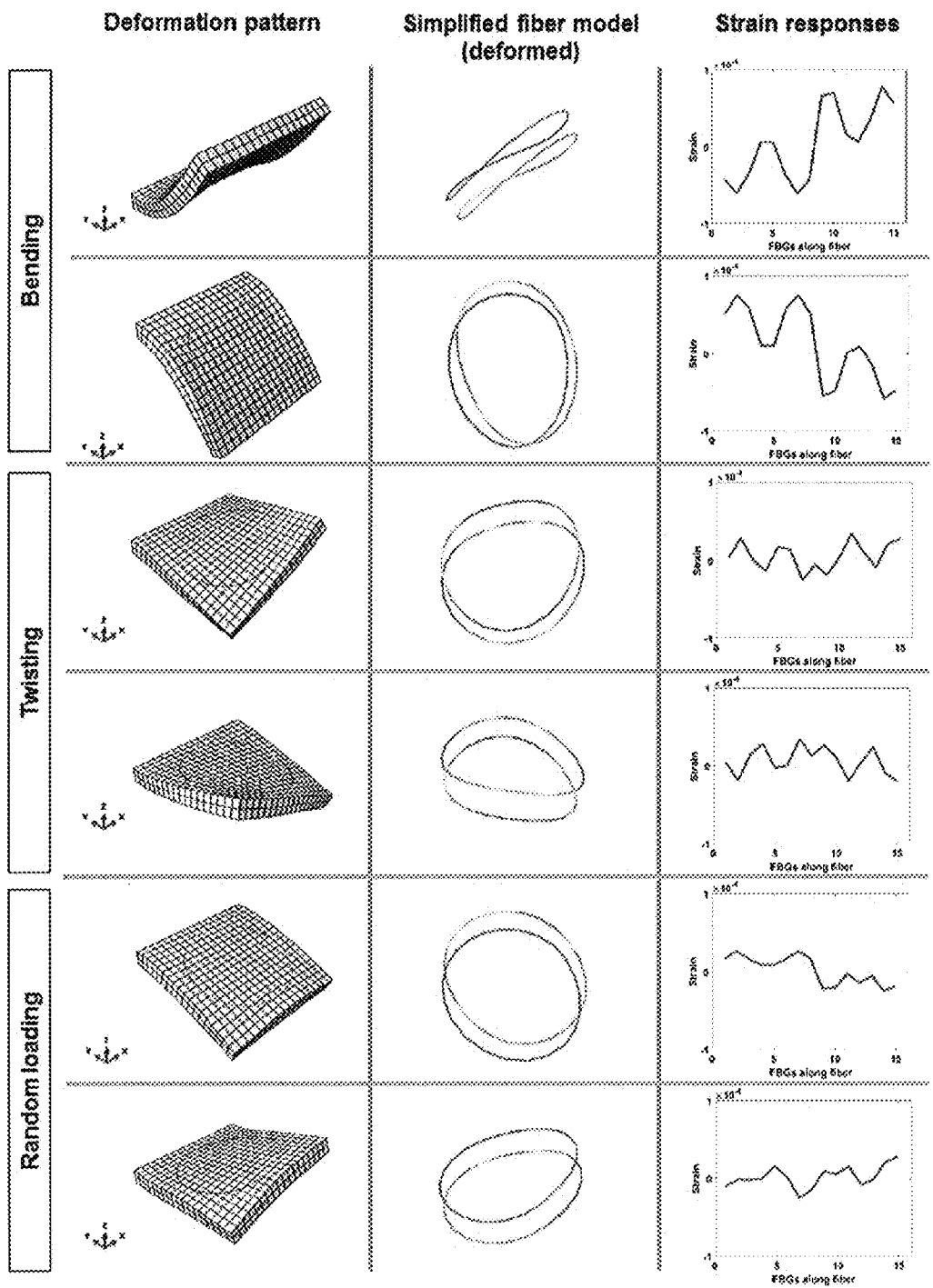
FIG. 10 shows a variety of simulated FEA fiber strains under different deformations.

To prove the uniqueness of the mapping and predict the sensor accuracy, surface information (i.e. displacement data) and simulated strain responses are extracted from finite element analysis (FEA) database for training. Using the finite element model defined above, pressure loadings are generated randomly on the highlighted surfaces as shown in FIG. 3D as red arrows on the right. The use of pressure loadings creates a smooth deformed surface without applying a concentrated force on a particular element or node, which could easily distort the elements. With a defined range of pressure, 729 simulations were done where each contains 10 steps. Thus 7290 data sets were generated. Some simulated responses are shown in FIG. 10. The x, y and z displacements of the nodes are extracted as target outputs, while the fiber strains (strain patterns) are defined as network inputs.

A typical multilayer feedforward network with two layers is used for training. The first hidden layer contains 10 neurons which connect to the inputs and the second layer produces the network outputs. The transfer function for the hidden layer is a hyperbolic tangent sigmoid function and the function of the output layer is a linear transfer function. The inputs in the neural network are the 44 sparse axial strains in fiber truss elements and the output nodes are from 1083 displacement data. Scaled conjugate gradient backpropagation is used since the network is large and requires less memory for calculations. A Levenberg-Marquardt backpropagation scheme may be used instead, as the network size is reduced in an actual sensor prototype. It updates the network using the following rule:

$$w_{k+1} = w_k + \Delta w_k \tag{13}$$

where $w_k$, $w_{k+1}$ are the updated networks at step k and k+1.

$$E(w) = \frac{1}{2}\sum_{i=1}^{N} e_i^2(w) = \frac{1}{2}\sum_{i=1}^{N}(t_i - o_i)^2 \tag{14}$$

where $t_i$ is the output displacement from the trained network, $o_i$ actual displacement in the experiment.

$$\nabla^2 E(w) = J^T(w)e(w) \tag{15}$$

where J is the Jacobian matrix of derivatives of each error with respect to each weight.

$$\nabla^2 E(w) = J^T(w)e(w) + S(w) \tag{16}$$

$$S(w) = \sum_{i=1}^{N} e_i(w) \nabla^2 e_i(w) \tag{17}$$

According to Newton's Method, $$\Delta w = -[\nabla^2 E(w)]^{-1} \nabla E(w) \tag{18}$$

Then taking Equation (17) and Equation (18) into it, we get $$\Delta w = -[J^T(w)J(w) + \mu I]^{-1} J^T(w) e(w) \tag{19}$$

I is the identity matrix, μ is a scalar which changes adaptively during iterations and e is the error vector.

The neural network performance is evaluated by mean square error (MSE):

$$MSE = \frac{1}{n}\sum_{i=1}^{n}(u_{i(actual)} - u_{i(nn)})^2 \tag{20}$$

where $u_{i(actual)}$ is the $i^{th}$ actual displacement in the experiment and $u_{i(nn)}$ is the $i^{th}$ output displacement from the trained network. The training stops when the magnitude of performance gradient is less than 1e$^{-6}$ or the validation performance stop decreasing. About 70% of the data is used for network training, 15% are used for validation and the last 15% are used for testing. The neural network training results showed a good fit with an R-squared value of 0.989, i.e., small errors overall. Axial strains of the fiber elements are set as neural network inputs and top surface node displacements are set as neural network outputs. The best validation performance is 0.055439 mm at epoch 5855. The high coefficient of regression implies the unique mapping of surface displacements and FBG strains. This also indicates the suggested fiber configuration is well positioned and able to represent and reconstruct the sensor surface accurately. The root mean square error is 0.2354 mm and the maximum error is 5.3485 mm.

Figure 9:
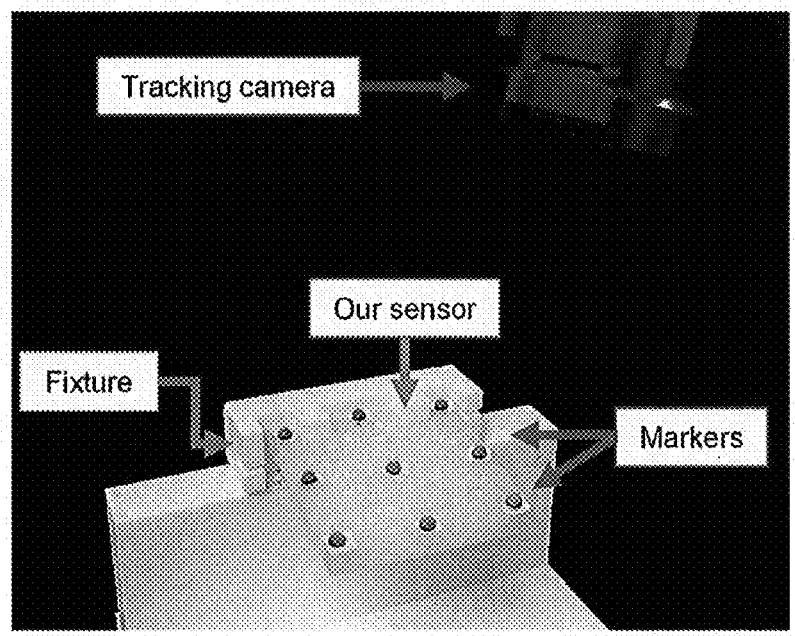
FIG. 9 is a photograph of a motion capture setup for training data collection according to the present invention.

In order to capture the data on the deformed surface, the sensor is clamped to a rigid fixture which limits the displacements only at one side, as shown in FIG. 9. An Optitrack motion capture or tracking system is used with two Flex 3 cameras to retrieve surface displacement information, which provide ground truth data for neural network training. The term "ground truth" refers to the accuracy of the training set's classification for supervised machine learning techniques. In this embodiment motion capture is the process of gathering the proper objective (provable) data or ground truth for this neural network. Passive markers are placed on the sensor surface to reflect IR light for tracking. Since the silicone surface has low surface energy and it is difficult for markers to attach firmly to the surface, Loctite 495 adhesive is first applied to the surface and small paper strips are bonded to the sensor to allow the position of the markers to be sensed. The paper strips can be easily removed after the data is captured. The streaming rate is 100 frames per second and the total number of markers is nine because of the tracking system's limitations. After calibration, the mean positional error is 0.015 mm.

In the training phase, the method for obtaining the sensor's surface shape ground truth is not limited to using a motion capture system. Any equipment that can obtain information with regard to the 3D surface shape of the sensor is suitable for use in this sensor design framework. Examples include: electromagnetic-based tracking systems, mono/stereo camera systems, laser-scanning systems.

FIG. 10 shows simulated fiber strains under different deformations. The first column shows the deformed sensor shape under different loading combinations. The second column is a colormap of the elastic strain component on the deformed fiber in the E11 direction. Warmer color indicates a higher strain induced on the fiber. The third column shows the simulated fiber strain patterns, which are the basis for identifying and discriminating different deformation modes. The strain responses are set as neural network inputs and the node displacements are set as targeted neural network outputs.

Figure 11:
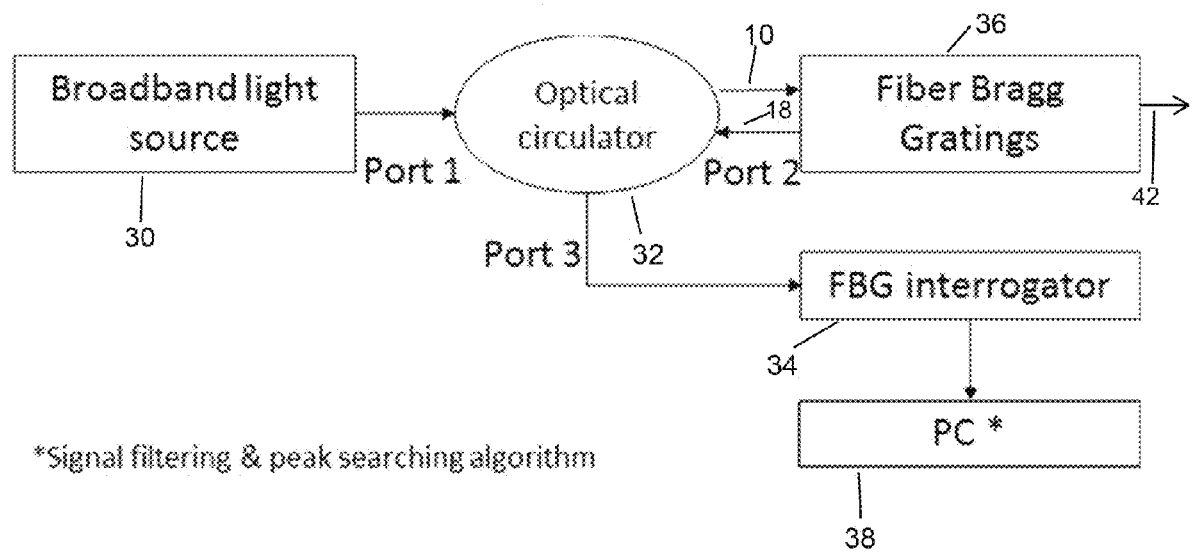
FIG. 11 is a schematic diagram of the overall sensing system of the present invention.

FIG. 11 is a schematic diagram of the sensing system of the present invention. It includes a light source 30, the FBG shape sensor 36 and the FBG interrogator 34, which are connected by a three-port optical circulator 32. With most of the incident spectrum 10 transmitted to the end 42 of the fiber of the sensor 36, the reflected spectrum 18 enters and is captured by the FBG interrogator 34. The optical signals are then sent to a processor or personal computer (PC) 38 for calculation of the reflected wavelengths.

In an exemplary embodiment the light source may be an Amonics ALS-CL-GFF-18-B-FA that transmits broadband invisible light from 1500 to 1595 nm to the optical fiber 36 via the optical circulator, which may be a PIOC-3-CL-P-90-10-FA. Light is reflected from fiber 36 due to the strain dependent change in the core refractive index. The reflected spectrum is sent to the FBG interrogation monitor 34 (I-MON 512 USB) from the output port of the optical circulator. Since light is multiplexable, light reflected at each grating on the fiber adds up to a reflected spectrum. This interrogation system can sense and identify over 70 FBGs with a wavelength resolution smaller than 0.5 pm and a maximum measuring frequency of 3000 Hz. The Bragg wavelengths are identified by peak searching algorithm and sent to the processor for analysis and surface reconstruction.

In order to generate different and complex deformation patterns, the sensor is bent manually without blocking the tracking markers for sensing. Linear actuator arrays are not used to generate loading patterns due to size limitation and the low flexibility in controlling the sensor's degrees of freedom. It could easily block the markers when the actuator end is not fixed to the sensor or causes damage to the sensor when firmly fixed. Since the system uses an optical interrogation system and motion tracking system at a high sampling rate, deforming the sensor manually allows complicated pattern formation with a short sampling time. About 1000 postures with corresponding Bragg spectrum are captured and trained with the same neural net setting. Although there could be fabrication defects and fiber dislocations, no calibrations are required since these errors are automatically included when training the neural network.

Figure 8:
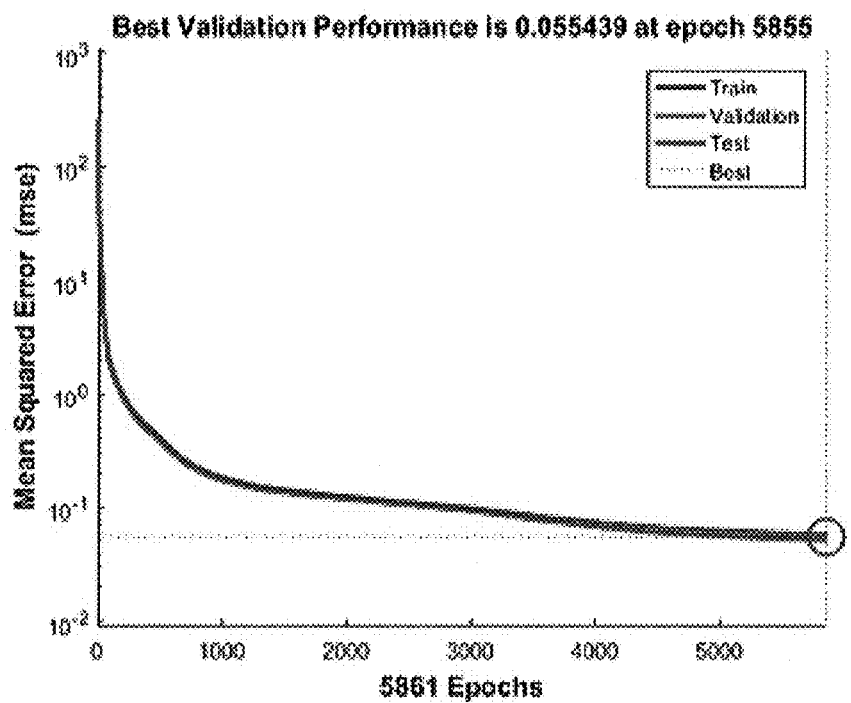
FIG. 8 is a graph of neural network training performance evaluated by the mean square error method.

In a test of the present invention similar Bragg wavelength patterns were observed and they agreed with the simulation results. In this text, 16 Bragg wavelengths with temperature compensation were set as inputs and 27 displacements were defined as outputs in order to model the wavelength and displacement relationship. The root mean square (RMS) error for all reconstructed displacement nodes was 0.9234 mm and the maximum error was 4.81 mm. See FIG. 8. The rise in RMS error compared to the FE simulation results may come from the measurement noise, calibration errors and the use of a simplified FE model. However, the sensing accuracy still exceeds that of recent shape sensing devices.

Common deformation mode shapes, such as bending and twisting, can also be reconstructed by the trained network. See FIG. 10. The measurable bending curvature is from 0 to 0.04 $mm^{-1}$. The refresh rate of the surface sensing loop is over 10 Hz with Matlab surface plotting function. A higher refresh rate can be achieved by using other programs with better graphics capability.

Figure 12:
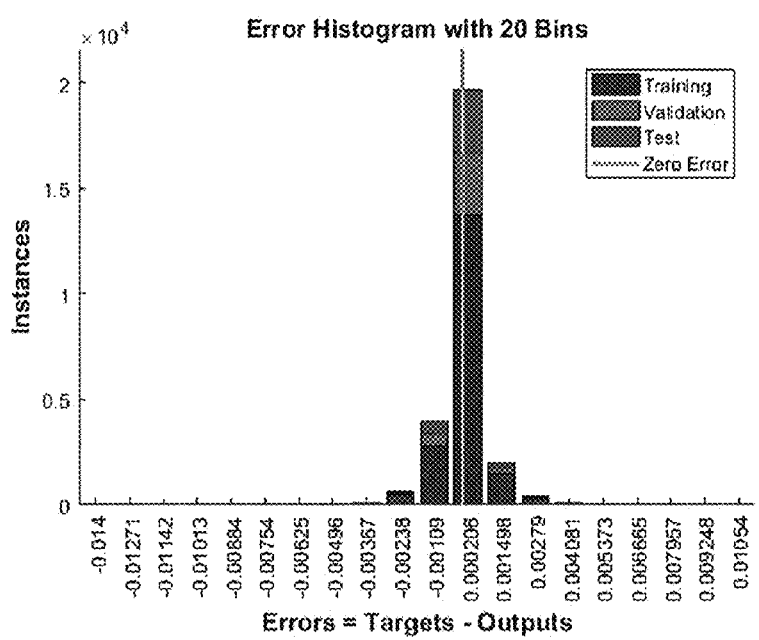
FIG. 12 is an error histogram of the trained neural network.

FIG. 12 is the error histogram of the trained network. Actual displacements, i.e. the tracking marker positions shown in FIG. 9 are set as target outputs. About 70% of the data is used for network training, 15% are used for validation and the last 15% are used for testing. The root mean square error is 0.9234 mm and the maximum error is 4.81 mm.

Figure 13A:
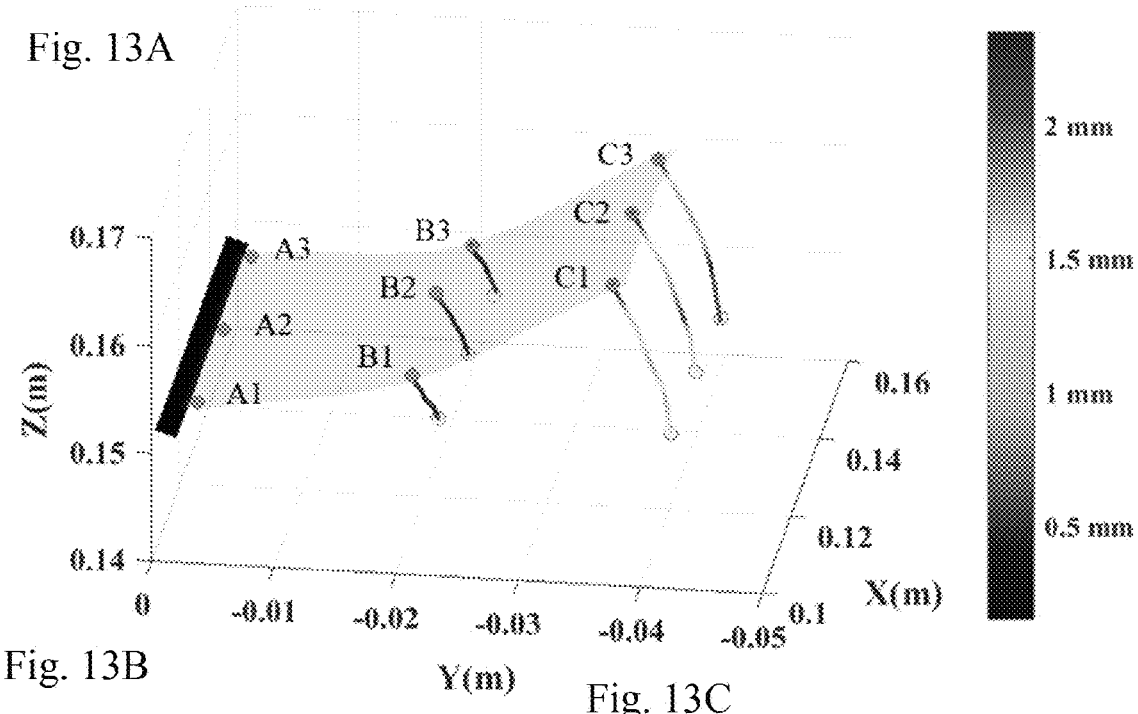
FIG. 13A is a 3D example of deformation of a sensor surface.
Figure 13B:
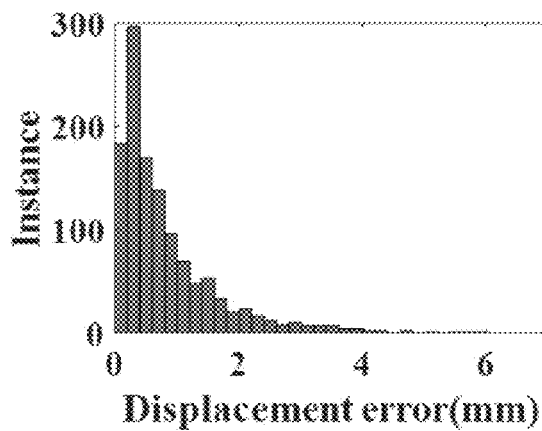
FIG. 13B is a displacement error histogram of an analysis of the surface shape reconstruction of FIG. 13A.
Figure 13C:
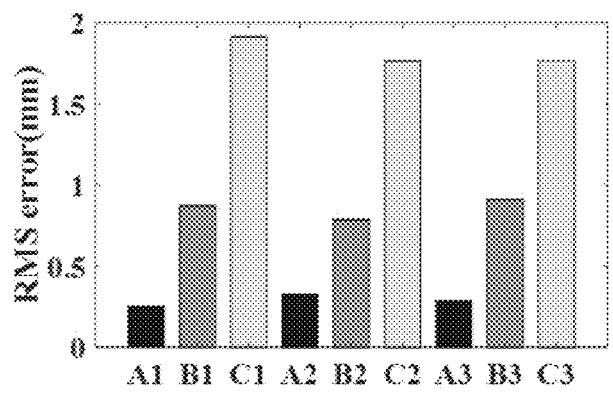
FIG. 13C is a reconstruction error histogram thereof.

The various diagrams of FIG. 13 represent an accuracy analysis of the surface shape reconstruction. In this analysis the sensing error can be obtained by comparing the ANN-estimated output coordinates with the IR-tracking ground truth. A sample deformation case is shown in FIG. 13A, where the sensor is fixed at one end and has the other end bent up from the neutral position. In the surface reconstruction sample the colored trajectories of the nine markers [A1, A2, A3, B1, B2, B3, C1, C2, C3] are illustrated and recorded. The warmer the color (toward red) the bigger the displacement errors relative to the ground truth. FIG. 13B shows the histogram of the displacement error distribution of all nodes throughout 1350 samples. The majority of node displacement errors are mostly below 2 mm. Larger errors are seen in nodes further from the clamped side (fixed end), i.e. C1~C3 in FIG. 13A. The root-mean-square error (RMSe) is about 1.8 mm for nodes C1~C3. In contrast, the nodes A1~A3, and B1~B3 had smaller errors, with RMSe at 1.17 mm across all nodes. The RMSe of all node displacements are shown in FIG. 13C. In general, the node displacement errors increased with the distance from the fixed end. This could be attributed to the distribution of node positions in the ANN training data. Every node has the same total samples, however the nodes at the free end, C1~C3, have a larger displacement range, when compared with nodes A1~A3 and B1~B3. This results in less spatially dense sample points, and hence poorer training performance for the distal nodes. This may be a primary cause for the increased reconstruction error at nodes C1~C3 as shown in FIG. 13C.

Reliability tests were performed to ensure consistent responses over a long operating period. Numerous repeated cycles of sensor motion were generated by 3 linear actuators, which pushed/pulled the nodes C1~C3, which resulted in periodic loading of the sensor. As illustrated in FIG. 14A, the sensor is clamped to a fixture and the free end was bent upward, downward and finally back to the neutral position in 2 seconds. A total of 1000 bending cycles were conducted over 50 min, with Bragg wavelength responses recorded at the peak of upward motion. FIG. 14B shows the reflected wavelength shift of eight FBGs on a layer. An enlarged or zoomed in view of a portion of one of the plots is provided in FIG. 14D. It can be observed that the wavelength shift values fluctuate slightly around a constant value. The box-plot (FIG. 14C) shows the distributions of the eight wavelength shifts. The wavelength fluctuations remained below 0.01 nm for all FBGs, corresponding to 0.3 mm displacement. This indicates that the sensor can maintain stable and reliable responses throughout 1000 deformation cycles. FIG. 14E is a hysteresis plot comparing vertical position of the distal node C2 (FIG. 13A) and the wavelength shift of the FBG with largest shift. The sensor was bent up and returned to the flat position for 3 cycles.

FIG. 15B shows a surface shape reconstruction example. A force is applied to the sensor and causes deformations on the sensor surface (FIG. 15A). The sensor surface is reconstructed by the trained neural network (FIG. 15B). The colormap indicates the depth of the surface.

An example of a surface shape sensing model of the side wing of a soft stingray is shown in FIG. 16A. A photograph of the model is shown in FIG. 16B in which the sensor is modified and embedded into model. The model is placed in a water tank with oscillating currents and the wing morphology is reconstructed in real-time as the wing shape opposes the water current flow. In this case, the morphology and swimming movement of soft and flexible robots can be studied directly with surface information feedback.

Figure 17:
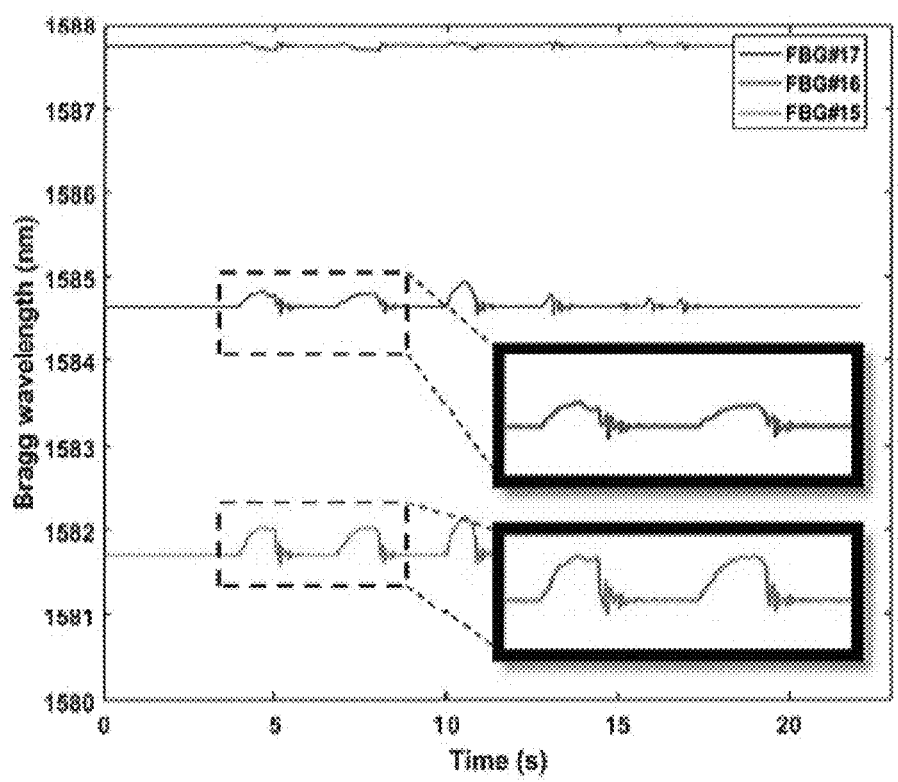
FIG. 17 is a graph of a vibration sensing arrangement.

Another example is to estimate the self- or externally excited vibrations on a flexible device. Instead of surface reconstruction, displacement data are captured continuously to construct vibration waveforms and to compute the vibration periods. Since Bragg wavelength responses are captured locally over the whole sensor, motion capturing and compensations at various locations are possible with the feedback from the sensor. Exemplary responses of the sensor are shown in FIG. 17 where an impulse load is applied on the free end, i.e., the opposite side from the clamped edge, of the sensor. The impulse generates vibrations in the sensor. Because a high sampling rate is available for the sensor, the dynamic responses are captured in the wavelength history. This enables vibration measurements and controls on soft robots. Similar waveforms are observed with small phase differences, which indicate the vibration frequency and wave propagation. This can be applied to swimming gait sensing and feedback control.

Despite the reasonable flexibility and ability to stretch of the present invention, the allowable strain caused by purely in-plane loading is still small. It is limited by the rigid optical fiber that constrains the deformation. In combination with the sensor's small size, more complex deformations could not be measured without risk of damage to the fiber. The sensor flexibility could be further enhanced by altering the fiber layout, but this requires consideration of other factors such as fiber length, number of FBGs, as well as the trade-off against the overall sensor sensitivity. Another limitation of the sensor of the present invention is the pressure sensitivity. Applying pressure to the sensor can induce strain in the FBGs without causing large deformation of the surface itself. This may cause incorrect shape reconstruction using the current approach. Techniques capable of distinguishing local pressure stimuli from the general shape reconstruction can be implemented. This would enable simultaneous measurement of shape and force, which is particularly important for haptics applications, and pressure distinctions can ultimately reduce reconstruction error. Furthermore, according to the present invention, ambient temperature changes near the sensor can be compensated. However, there would still be some difficulty in compensating for local temperature changes at each FBG, which is an inherent disadvantage of using one single-core fiber.

Other techniques, such as optical power measures and supersonic cluster beam implantation (SCBI) [30], may be used to provide information to distinguish different stimuli.

The present invention relates to a high-accuracy surface shape sensor. Using fiber optics, surface information is measured by an optical spectrum and is mapped by a machine learning algorithm. Finite element simulations are conducted to study, analyze the sensor parameters and to predict the sensing response and accuracy. A soft and flexible surface provides surface morphology information in real-time that is useful in soft robots and other potential applications. The main features of the present invention are:

1. Utilization of only a single-core optic fiber to detect the change of surface shape in real time. A number of prior art studies reconstruct the shape of the optical fiber itself by either using a multi-core optical fiber or bundling multiple single-core fibers. In those examples, only the actual fiber shape is reconstructed, and not the surface shape as with the present invention. Additionally, using multi-core or multiple fibers increases the overall cost of the sensor due to fabrication costs and the requirement for a multiple channel optical interrogator.
2. The underlying optical fiber sensor is not limited to the conventional silica-based fibers and can be extended to use polymer-based fibers that can provide enhanced flexibility and elongation, while maintaining optical performance similar to conventional silica fibers. With polymer-based fiber, the flexibility and deformability of the surface shape sensor is improved.
3. When scaling to larger sizes, the number of physical inputs/outputs of the proposed sensor remain the same due to its optical nature. Electrode-based sensors such as those using accelerometers require additional accessing electrodes as the number of sensing elements in the sensor increases, making them impractical for scaling to larger sizes or for higher density sensing.
4. Detailed FEA modeling is used to determine the design parameters and validate the uniqueness of the sensor. By implementing computer assisted analysis via FEA, sensor parameters can be determined beforehand to optimize the underlying sensor layout and tailor it to each application. The base sensor shape is not limited to a rectangular sheet and can be changed freely based on the desired application.
5. The application of machine learning provides 3D surface shape reconstruction that is more robust against inevitable inaccuracies during sensor fabrication.
6. In the training phase, FEA can be used to accelerate the machine learning process by initializing the training model with simulated data samples. Shape reconstruction purely based on this FEA initialization would not be entirely accurate, therefore a small amount of real data can be used to perform calibration. In this way, the majority of the training procedure can be quickly and automatically performed in a digital environment, reducing the reliance on time-consuming and costly real data collection.
7. In the shape reconstruction phase, FEA can be used to increase the sensing resolution by accurately interpolating between sparse positional nodes that are output from the machine learning-based reconstruction model. For example, if a motion-capture system using sparsely distributed reflective nodes (giving the 3D position of each node as the sensor ground truth) is used as the output when training the machine learning algorithm, the spatial resolution of the shape reconstruction can be improved by interpolating using a FEA-based simulation model.
8. No external, line-of-sight sensors such as cameras are required during real-time shape reconstruction with the present invention.
9. The surface shape sensor's design methodology/framework is applicable to other underlying strain/displacement sensing modalities (not limited to FBGs) that are inherently flexible and also can be used with different substrate types. This is due to the flexibility and customizability of FEA simulation and the machine learning-based reconstruction approach of the present invention.
10. In the presented embodiment, training data of the sensor is obtained using a motion-capture system that collects the 3D position of infrared markers attached to the sensor surface. Other methods for obtaining this "ground truth" can be substituted for use in the presented invention's design methodology, e.g. electromagnetic (EM) sensor systems, stereo cameras for 3D reconstruction, laser-based 3D sensors, monocular cameras, etc. i.e. any sensing apparatus that can provide the ground-truth measurement of the sensor surface.

Another embodiment of the present invention makes use of the same design and reconstruction methodology as that disclosed for the FBG-based sensor. However, instead of FBG-based sensors, the underlying sensing elements are eutectic Gallium Indium (EGaIn, liquid metal) strain sensors. These sensing elements are structured like traditional strain gauges and measure the resistance change between two terminals as a measure of strain. However, instead of rigid metal wire traces embedded in a stiff plastic, the EGaIn sensors use liquid metal channels embedded in a flexible substrate like silicone. When the sensing element is stretched, the channels constrict and elongate, causing an increase in resistance. These sensing elements are typically designed to be more sensitive in their longitudinal direction based on the wire trace layout.

Figure 18:
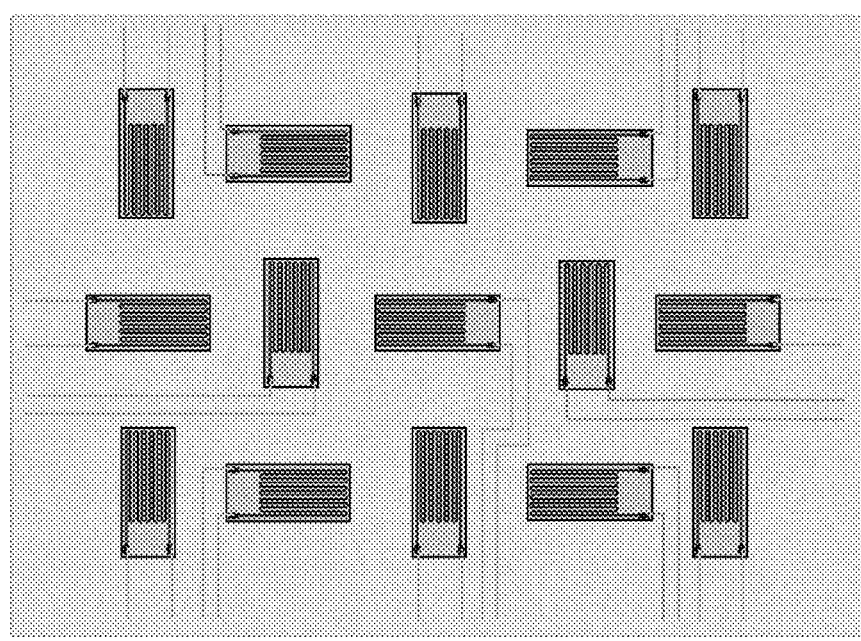
FIG. 18 illustrates a layout of sensors according to another embodiment of the present invention.

In this embodiment, multiple strain sensing elements are embedded in a flexible elastomeric substrate in order to obtain localized strain data for shape reconstruction. FEA and machine learning can be applied in the same way in this embodiment. Note that in this case, the sensing elements are independently connected, unlike the FBGs which are connected along a single optical fiber. As shown in FIG. 18, the sensors are laid out in a grid-like way, but they can be placed arbitrarily (or based on design decisions made from FEA). Note that two (2) connecting electrodes are required for each strain measurement in this embodiment. This is just one other example of sensing elements that can be used with the present invention. Others may not necessarily need as many connecting electrodes.

In yet another embodiment, the underlying sensing elements can be any sensing element that has high multiplexing ability.

In one embodiment, the flexible substrate can be woven fabric. In another embodiment, the flexible substrate can be thin and flexible sheets of plastic or metal. In yet a further embodiment, the flexible substrate can be any flexible material to which the sensors can be fixed.

REFERENCES

The references listed below are cited throughout the specification and are identified by the corresponding number(s) placed in square brackets [ ]. Each of the following references is incorporated herein by reference in its entirety:

[1] K.-H. Lee et al., "Nonparametric Online Learning Control for Soft Continuum Robot: An Enabling Technique for Effective Endoscopic Navigation," *Soft robotics*, vol. 4, no. 4, pp. 324-337, 2017.

[2] P. Polygerinos, Z. Wang, K. C. Galloway, R. J. Wood, and C. J. Walsh, "Soft robotic glove for combined assistance and at-home rehabilitation," *Robotics and Autonomous Systems*, vol. 73, pp. 135-143, 2015.

[3] C. Laschi, B. Mazzolai, and M. Cianchetti, "Soft robotics: Technologies and systems pushing the boundaries of robot abilities," *Sci. Robot.*, vol. 1, no. 1, p. eaah3690, 2016.

[4] G. Sansoni, M. Trebeschi et al., "State-of-the-art and applications of 3D imaging sensors in industry, cultural heritage, medicine, and criminal investigation," *Sensors*, vol. 9, no. 1, pp. 568-601, 2009.

[5] F. Saunders, E. Golden, R. D. White, and J. Rife, "Experimental verification of soft-robot gaits evolved using a lumped dynamic model," *Robotica*, vol. 29, no. 6, pp. 823-830, 2011.

[6] M. K. Dobrzynski, R. Pericet-Camara et al., "Contactless deflection sensor for soft robots," in *Intelligent Robots and Systems (IROS), 2011 IEEE/RSJ International Conference on*, 2011, pp. 1913-1918: IEEE.

[7] W. Yuan, S. Dong, and E. H. Adelson, "GelSight: High-Resolution Robot Tactile Sensors for Estimating Geometry and Force," *Sensors (Basel)*, vol. 17, no. 12, Nov. 29, 2017.

[8] K. Sato, K. Kamiyama, N. Kawakami, and S. Tachi, "Finger-Shaped GelForce: Sensor for Measuring Surface Traction Fields for Robotic Hand," *IEEE Trans Haptics*, vol. 3, no. 1, pp. 37-47, January-March 2010.

[9] A. Hermanis, R. Cacurs, and M. Greitans, "Acceleration and magnetic sensor network for shape sensing," *IEEE Sensors Journal*, vol. 16, no. 5, pp. 1271-1280, 2016.

[10] A. Hermanis and K. Nesenbergs, "Grid shaped accelerometer network for surface shape recognition," in *Electronics Conference (BEC), 2012 13th Biennial Baltic*, 2012, pp. 203-206: IEEE.

[11] P. Mittendorfer and G. Cheng, "3D surface reconstruction for robotic body parts with artificial skins," in *Intelligent Robots and Systems (IROS), 2012 IEEE/RSJ International Conference on*, 2012, pp. 4505-4510: IEEE.

[12] N. Saguin-Sprynski, L. Jouanet, B. Lacolle, and L. Biard, "Surfaces reconstruction via inertial sensors for monitoring," in *EWSHM-7th European Workshop on Structural Health Monitoring*, 2014.

[13] Y.-L. Park, B.-R. Chen, and R. J. Wood, "Design and fabrication of soft artificial skin using embedded microchannels and liquid conductors," *IEEE Sensors Journal*, vol. 12, no. 8, pp. 2711-2718, 2012.

[14] V. Wall, G. Zoller, and O. Brock, "A method for sensorizing soft actuators and its application to the RBO hand 2," in *Robotics and Automation (ICRA), 2017 IEEE International Conference on*, 2017, pp. 4965-4970: IEEE.

[15] H.-N. Li, D.-S. Li, and G.-B. Song, "Recent applications of fiber optic sensors to health monitoring in civil engineering," *Engineering structures*, vol. 26, no. 11, pp. 1647-1657, 2004.

[16] G. C. Kahandawa, J. Epaarachchi, H. Wang, and K. Lau, "Use of FBG sensors for SHM in aerospace structures," *Photonic Sensors*, vol. 2, no. 3, pp. 203-214, 2012.

[17] K. O. Hill and G. Meltz, "Fiber Bragg grating technology fundamentals and overview," *Journal of lightwave technology*, vol. 15, no. 8, pp. 1263-1276, 1997.

[18] P. Wei, J. Liu, Z. Dai, and M. Li, "Monitoring the Shape of Satellite Wing Frame Using FBG Sensors in High Electronc Noise, Vacuum and −196° C. Environment," *IEEE Transactions on Industrial Electronics*, vol. 64, no. 1, pp. 691-700, 2017.

[19] B. A. Childers et al., "Use of 3000 Bragg grating strain sensors distributed on four 8-m optical fibers during static load tests of a composite structure," in *Smart Structures and Materials 2001: Industrial and Commercial Applications of Smart Structures Technologies*, 2001, vol. 4332, pp. 133-143: International Society for Optics and Photonics.

[20] M. Amanzadeh, S. M. Aminossadati et al., "Recent Developments in Fibre Optic Shape Sensing," *Measurement*, 2018.

[21] S. C. Ryu and P. E. Dupont, "FBG-based shape sensing tubes for continuum robots," in *Robotics and Automation (ICRA), 2014 IEEE International Conference on*, 2014, pp. 3531-3537: IEEE.

[22] C. Shi et al., "Shape sensing techniques for continuum robots in minimally invasive surgery: A survey," *IEEE Transactions on Biomedical Engineering*, vol. 64, no. 8, pp. 1665-1678, 2017.

[23] A. F. da Silva, A. F. Gonçalves, P. M. Mendes, and J. H. Correia, "FBG sensing glove for monitoring hand posture," *IEEE Sensors Journal*, vol. 11, no. 10, pp. 2442-2448, 2011.

[24] L. Xu, J. Ge, J. H. Patel, and M. P. Fok, "3-Dimensional soft shape sensor based on dual-layer orthogonal fiber Bragg grating mesh," in *Optical Fiber Communications Conference and Exhibition (OFC), 2017*, 2017, pp. 1-3: IEEE.

[25] H. Zhang, X. Zhu, Z. Gao, K. Liu, and F. Jiang, "Fiber Bragg grating plate structure shape reconstruction algorithm based on orthogonal curve net," *Journal of Intelligent Material Systems and Structures*, vol. 27, no. 17, pp. 2416-2425, 2016.

[26] S. Rapp, L.-H. Kang, U. C. Mueller, J.-H. Han, and H. Baier, "Dynamic shape estimation by modal approach using fiber Bragg grating strain sensors," in *Sensors and Smart Structures Technologies for Civil, Mechanical, and Aerospace Systems 2007*, 2007, vol. 6529, p. 65293E: International Society for Optics and Photonics.

[27] R. Kashyap, *Fiber Bragg Gratings*. 2010.

[28] M. Kreuzer, "Strain measurement with fiber Bragg grating sensors," *HBM, Darmstadt*, S2338-1.0 e, 2006.

[29] P. Moseley, J. M. Florez, H. A. Sonar, G. Agarwal, W. Curtin, and J. Paik, "Modeling, design, and development of soft pneumatic actuators with finite element method," *Advanced Engineering Materials*, vol. 18, no. 6, pp. 978-988, 2016.

[30] M. Totaro, A. Mondini, A. Bellacicca, P. Milani, and L. Beccai, "Integrated Simultaneous Detection of Tactile and Bending Cues for Soft Robotics," *Soft Robotics*, 2017.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

While the present invention has been particularly shown and described with reference to preferred embodiments thereof; it will be understood by those skilled in the art that various changes in form and details may be made therein without departing from the spirit and scope of the invention.

What we claim is:

1. A surface shape sensor, comprising:
    a flexible elastomer substrate that is stretchable in different directions; and
    at least one single-core optical fiber embedded in the substrate, said fiber having a series of at least two fiber Bragg gratings (FBGs) located at predetermined positions along the length of the optical fiber;
    wherein said fiber is adapted to receive an incident light spectrum at one end of the fiber from a light source, whereby each grating of the fiber has an index modulation which reflects particular wavelengths of the light spectrum that satisfy the Bragg condition, while the rest of the light spectrum passes through the fiber, and the refractive index of the FBGs changes with strain on the substrate due to deflection of it; and
    wherein a surface shape of the substrate is reconstructed in real-time by analyzing the reflected light spectrum to extract data generated by the unique deformation patterns of the FBG sensors in the optical fiber and by analyzing the data by a non-linear regression method using a neural network.

2. The surface shape sensor of claim 1 wherein design parameters are configured to be customized to each surface prior to fabrication through numerical analysis of finite-element modeling (FEM); and
    the design parameters are selected from the group consisting of substrate thickness and sensor layout.

3. The surface shape sensor of claim 1 wherein the fiber is silica-based optical fiber.

4. The surface shape sensor of claim 1 wherein the fiber is polymer-based fiber.

5. The surface shape sensor of claim 1 wherein the substrate is made of silicone rubber and has a flat shape.

6. The surface shape senor of claim 1 wherein the series of FBGs include one for temperature compensation that is spaced from the others that are used to sense deformation of the substrate.

7. A surface shape determination system comprising:
    the surface shape sensor as recited in claim 1;
    a light source for generating an incident light spectrum at one end of the fiber;
    an interrogator that captures the reflected wavelengths of the light and retrieves signal information therefrom; and
    a processor that receives the output of the interrogator and performs non-linear regression analysis on the information to reconstruct a surface morphology in real-time.

8. The surface shape determination system of claim 7 further including a circulator, wherein the light from the light source is applied to the circulator and is delivered by the circulator to the fiber, the reflected light from the fiber is applied to the circulator and is delivered to the interrogator.

9. The surface shape determination system of claim 7 wherein the sensor substrate is bonded to the surface of an object so that the surface of the object is determined.

10. The surface shape determination system of claim 7 wherein the object is a portion of a soft robot.

11. The surface shape determination system of claim 7 wherein the light source generates broadband invisible light with wavelengths from 1500 to 1595 nm.

12. The surface shape sensor of claim 1 wherein the flexible elastomer substrate comprises: i) a top thin silicone protection layer, ii) a first FBG layer, iii) a silicone plate, iv) a second FBG layer, and v) a bottom thin silicone protection layer.

13. The surface shape sensor of claim 1 wherein a larger sensing area is attained by increasing the number of FBGs in the optical fiber and/or by including additional single-core optical fibers in the same substrate.

14. A surface shape sensor, comprising:
    at least two flexible elastomer substrate layers;
    at least a portion of a strain sensor embedded in each of the substrate layers, each sensor generating a signal indicative of the strain at the location of the substrate layer; and
    wherein the surface shape of an object upon which the substrate layers are fastened is reconstructed in real-time by analyzing the signals from the sensors so as to extract data generated by the unique deformation patterns of the sensors and by analyzing the data by a non-linear regression method using a neural network.

15. A surface shape sensor, comprising:
    a flexible elastomer substrate that is stretchable in different directions;
    at least one sensor embedded in the substrate, said sensor indicating multiple measurements at spaced locations, but having high multiplexing capabilities so that it has few input/output connections;
    wherein said sensor is adapted to indicate strain on the substrate at the spaced locations due to deflection of said substrate; and
    wherein a surface shape of the substrate is reconstructed in real-time by analyzing the multiple measurements to extract data generated by the sensor and by analyzing the data by a non-linear regression method using a neural network.

16. The surface shape sensor of claim 15 wherein the sensor is at least one single-core optical fiber embedded in the substrate, said fiber having a series of at least two fiber Bragg gratings (FBGs) located at predetermined positions along the length of the optical fiber.

17. The surface shape sensor of claim 15 wherein the sensor is at least one eutectic Gallium Iridium (EGaIn, liquid metal) strain sensor.

18. A method for performing continuous deformation modeling and continuous morphology detection of a surface, comprising the steps of:
    providing at least one surface shape sensor as defined by claim 15;
    using a non-linear regression method in the form of a machine learning algorithm, e.g. a neural network, to characterize and calibrate the data from the sensors, and
    simulating the surface shape from the movement of the sensors based on the computational model of the particular surface.

19. The method of claim 18 further including the use of motion capture for obtaining ground-truth data for the machine learning algorithm.

20. The method of claim 19 further including one of electromagnetic (EM) sensor systems, stereo cameras for 3D reconstruction, laser-based 3D sensors, monocular cameras and other sensing apparatus for obtaining ground-truth data for the machine learning algorithm.

21. A surface shape sensor, comprising:
- a flexible elastomer substrate that is stretchable in different directions; and
- at least one single-core optical fiber embedded in the substrate, said fiber having a series of at least two fiber Bragg gratings (FBGs) located at predetermined positions along the length of the optical fiber;
- wherein said fiber is adapted to receive an incident light spectrum at one end of the fiber from a light source, whereby each grating of the fiber has an index modulation which reflects particular wavelengths of the light spectrum that satisfy the Bragg condition, while the rest of the light spectrum passes through the fiber, and the refractive index of the FBGs changes with strain on the substrate due to deflection of it;
- wherein a surface shape of the substrate is reconstructed by analyzing the reflected light spectrum to extract data generated by the unique deformation patterns of the FBG sensors in the optical fiber and by analyzing the data by a non-linear regression method; and
- wherein the fiber is coiled in to a circular shape twice in the substrate, once at an upper surface and once at a lower surface, and the fiber is offset from the mid-plane and the substrate has a suitable thickness in order to discriminate deformation patterns.

* * * * *